(12) United States Patent
Enomoto

(10) Patent No.: US 11,252,144 B2
(45) Date of Patent: Feb. 15, 2022

(54) AUTHENTICATION SYSTEM USING KEY IDENTIFICATION INFORMATION

(71) Applicant: CANON KABUSHIKI KAISHA, Tokyo (JP)

(72) Inventor: Hisashi Enomoto, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 114 days.

(21) Appl. No.: 16/823,625

(22) Filed: Mar. 19, 2020

(65) Prior Publication Data
US 2020/0314082 A1 Oct. 1, 2020

(30) Foreign Application Priority Data

Mar. 26, 2019 (JP) .............................. JP2019-058898
Mar. 5, 2020 (JP) .............................. JP2020-038129

(51) Int. Cl.
*H04L 29/06* (2006.01)
*H04L 9/08* (2006.01)
(Continued)

(52) U.S. Cl.
CPC .......... *H04L 63/083* (2013.01); *G06F 3/1219* (2013.01); *G06F 3/1222* (2013.01);
(Continued)

(58) Field of Classification Search
CPC ... H04L 63/083; H04L 9/0863; H04L 9/3236; G06F 3/1219; G06F 3/1222; G06F 3/1239
See application file for complete search history.

(56) References Cited

U.S. PATENT DOCUMENTS 7,788,490 B2 * 8/2010 Adkins ................. H04L 9/3271
713/168
8,494,379 B2 7/2013 Kim
(Continued)

FOREIGN PATENT DOCUMENTS

JP    2009163208 A    7/2009
JP    2018093372 A    6/2018

OTHER PUBLICATIONS

Rainer Falk, Steffen Fries "Advances in Protecting Remote Component AuthenticationAdvances in Protecting Remote Component Authentication", International Journal on Advances in Security, vol. 5 No. 1 & 2, year 2012, http://www.iariajournals.org/security/, pp. 28-35 (Year: 2012).*

*Primary Examiner* — Catherine Thiaw
(74) *Attorney, Agent, or Firm* — Venable LLP

(57) ABSTRACT

An authentication-target apparatus stores a first authentication-target key, a second authentication-target key, a first password, a second password, identification information of the authentication-target apparatus, the first key identification information, and the second key identification information. An authentication apparatus performs a first authentication session using a password corresponding to key identification information common to the authentication-target apparatus and the authentication apparatus. When the first authentication session is successful, the authentication apparatus performs a second authentication session using an authentication-target key corresponding to a common key identification information.

16 Claims, 13 Drawing Sheets

(51) Int. Cl.
*H04L 9/32* (2006.01)
*G06F 3/12* (2006.01)
(52) U.S. Cl.
CPC .......... *G06F 3/1239* (2013.01); *H04L 9/0863* (2013.01); *H04L 9/3236* (2013.01)

(56) References Cited

U.S. PATENT DOCUMENTS

| | | | |
|---|---|---|---|
| 9,141,816 B2* | 9/2015 | Refstrup | B41J 2/17546 |
| 2004/0255149 A1* | 12/2004 | Toyama | G06F 21/57 |
| | | | 726/17 |
| 2009/0132746 A1* | 5/2009 | Tom | H04L 67/04 |
| | | | 710/300 |
| 2014/0205095 A1* | 7/2014 | Ittogi | H04L 9/30 |
| | | | 380/243 |
| 2015/0110504 A1* | 4/2015 | Lee | H04N 1/44 |
| | | | 399/12 |
| 2017/0366350 A1* | 12/2017 | Ness | B41J 2/17543 |
| 2020/0034554 A1 | 1/2020 | Enomoto | |

* cited by examiner

FIG. 4A

| COMMAND | INSTRUCTION CONTENT | OPTION DATA |
|---|---|---|
| 01h | START AUTHENTICATION-TARGET WITHOUT PASSWORD | KEY ID TO BE USED IN AUTHENTICATION-TARGET CALCULATION (e.g., ID10) |
| 02h | START AUTHENTICATION-TARGET WITH PASSWORD | KEY ID TO BE USED IN AUTHENTICATION-TARGET CALCULATION (e.g., ID10), DERIVATIVE PASSWORD (e.g., Bpwd10) |
| 03h | START AUTHENTICATION-TARGET CALCULATION | CALCULATION CONDITIONS (e.g., ONE-WAY FUNCTION x) |
| 04h | AUTHENTICATION CHECK | CALCULATION CONDITIONS (e.g., ONE-WAY FUNCTION x, CRGID), CALCULATION RESULTS (e.g., x (Bk)) |
| 40h | GENERATE PASSWORD | PASSWORD DERIVATIVE (e.g., CRGID) |
| 7Eh | READ OUT PUBLIC DATA | NONE |
| 7Fh | READ OUT PUBLIC DATA | NONE |

FIG. 4B

| RESPONSE | INSTRUCTION CONTENT | OPTION DATA |
|---|---|---|
| 80h | SUCCESS | EXECUTION RESULT |
| FFh | FAILURE | NONE |

AUTHENTICATION SYSTEM USING KEY IDENTIFICATION INFORMATION

BACKGROUND OF THE INVENTION

Field of the Invention

The present invention relates to an authentication system that uses key identification information.

Description of the Related Art

In an electronic device such as an image forming apparatus, replacing components (consumables) which have reached their replacement period enables that electronic device to realize its original functions. However, the electronic device may malfunction if the consumable is not a genuine product. It is thus recommended that such consumables be attached to the electronic device.

Japanese Patent Laid-Open No. 2009-163208 proposes a method of authenticating a cartridge by verifying secret authentication data stored in an authentication-target IC chip provided in the cartridge against secret authentication data stored in an authentication apparatus provided in a printer. Japanese Patent Laid-Open No. 2018-093372 proposes an authentication apparatus switching among multiple pieces of secret authentication data stored in an authentication-target apparatus and using that data.

The authentication apparatus in Japanese Patent Laid-Open No. 2018-093372 reads out a key ID of a secret key from public memory, and computes an authentication value from a derivative key corresponding to the key ID. The authentication-target apparatus computes an authentication value from a master key corresponding to the key ID and a derivative value. Finally, the authentication apparatus verifies the two authentication values. While the authentication method according to Japanese Patent Laid-Open No. 2018-093372 is good in that it is simple, there is still room for improvement in terms of security.

SUMMARY OF THE INVENTION

The present invention provides an authentication system comprising an authentication-target apparatus and an authentication apparatus that authenticates the authentication-target apparatus. The authentication-target apparatus comprises the following elements: a first storage unit that stores a first authentication-target key given first key identification information, a second authentication-target key given second key identification information, a first password associated with the first key identification information, a second password associated with the second key identification information, identification information of the authentication-target apparatus, the first key identification information, and the second key identification information, and a first computation unit. The authentication apparatus comprises a second storage unit that stores an authentication key, third key identification information given to the authentication key, and a third password, and a second computation unit. The second computation unit determines key identification information common between the authentication-target apparatus and the authentication apparatus on the basis of the first key identification information and the second key identification information stored in the first storage unit of the authentication-target apparatus and the third key identification information stored in the second storage unit of the authentication apparatus, computes password derivative information on the basis of identification information of the authentication-target apparatus stored in the first storage unit of the authentication-target apparatus and the third password stored in the second storage unit of the authentication apparatus, and sends the password derivative information and the key identification information common between the authentication-target apparatus and the authentication apparatus to the authentication-target apparatus. The first computation unit finds a computation result by applying a predetermined function to the password derivative information received from the authentication apparatus, executes password authentication on the basis of the computation result and a password associated with the key identification information, of the first key identification information and the second key identification information, that is common between the authentication-target apparatus and the authentication apparatus, and finds, when the password authentication succeeds, first key derivative information by executing a predetermined calculation on an authentication-target key associated with the key identification information, of the first key identification information and the second key identification information, that is common between the authentication-target apparatus and the authentication apparatus. The second computation unit reproduces, when the password authentication by the first computation unit succeeds, an authentication-target key associated with the key identification information common between the authentication-target apparatus and the authentication apparatus by executing a predetermined computation on the basis of the identification information of the authentication-target apparatus and the authentication key, and finds second key derivative information by executing the predetermined calculation on the reproduced authentication-target key, and authenticates the authentication-target apparatus on the basis of the first key derivative information found by the first computation unit and the second key derivative information found by the second computation unit.

Further features of the present invention will become apparent from the following description of exemplary embodiments (with reference to the attached drawings).

BRIEF DESCRIPTION OF THE DRAWINGS

FIGS. 4A and 4B are diagrams illustrating communication protocols.

DESCRIPTION OF THE EMBODIMENTS

Figure 1A:
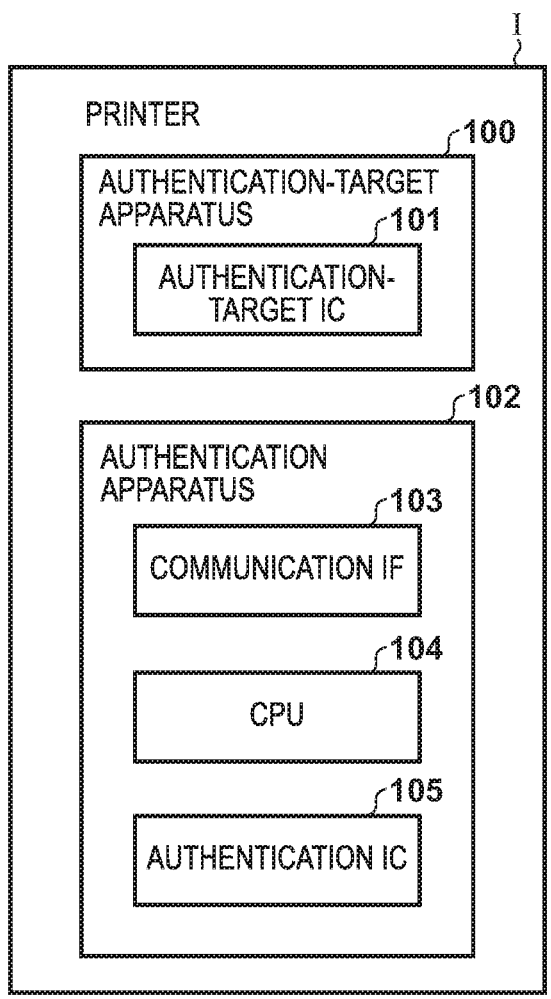
FIGS. 1A and 1B are diagrams illustrating an authentication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A printer (an image forming apparatus) is used as one example of an electronic device according to an embodiment. A cartridge is used as one example of a consumable (a replacement component). The "cartridge" is a unit that can be attached to and removed from a printer, such as a toner cartridge, a drum cartridge, an ink cartridge, a fixing unit, an intermediate transfer unit, and the like. Here, the printer (image forming apparatus) will be described using the color image forming apparatus illustrated in FIG. 13 as an example.

Figure 13:
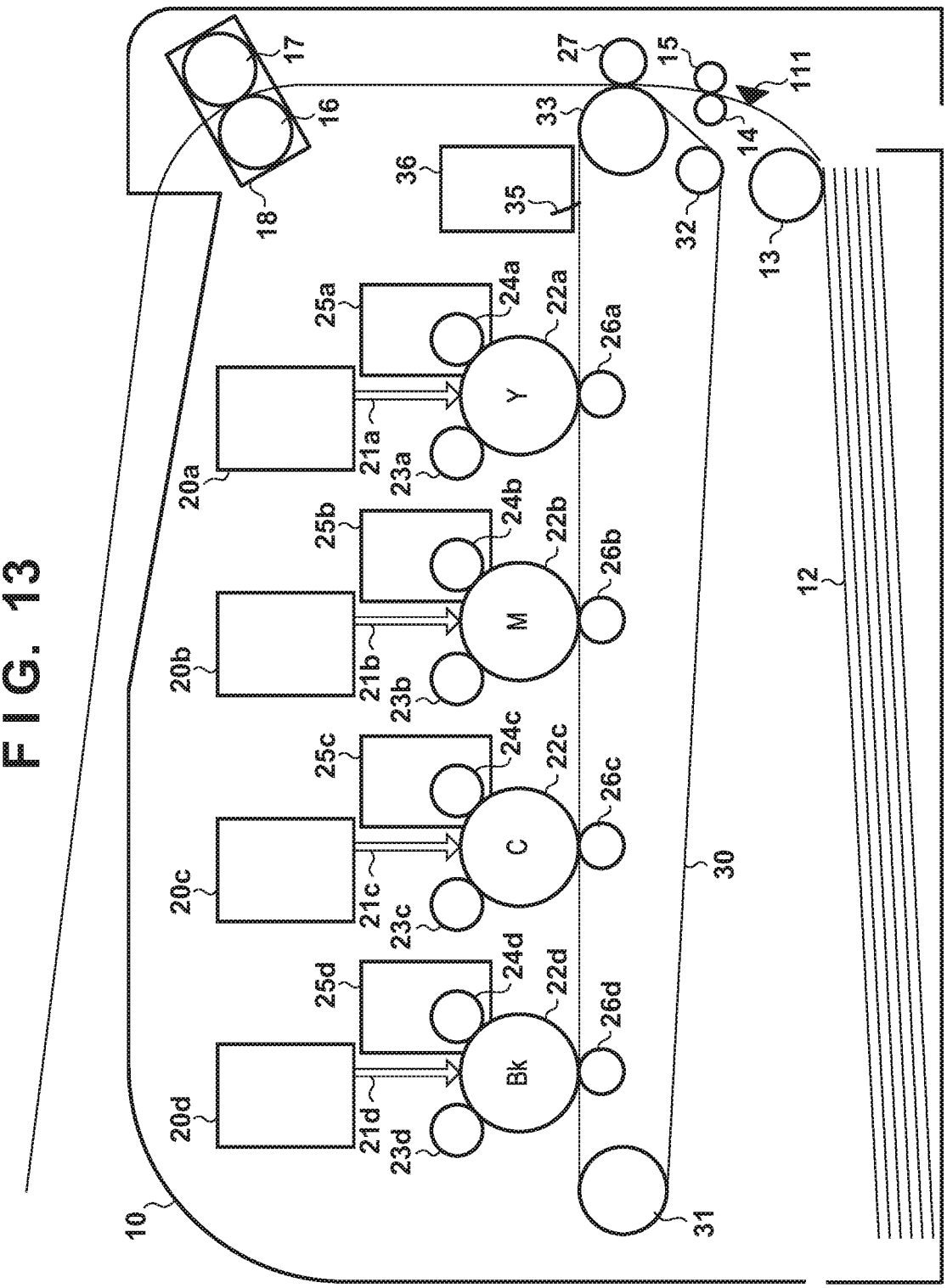
FIG. 13 is a schematic diagram illustrating a color image forming apparatus.

FIG. 13 is a diagram illustrating the configuration of a color image forming apparatus 10. A pickup roller 13 feeds a sheet 12 to a transport path. Once the leading end of the sheet 12 has been detected by a resist sensor 111, and the leading end of the sheet 12 has passed transport rollers 14 and 15, the transport rollers 14 and 15 stop. The transport of the sheet 12 temporarily stops as a result. Charging rollers 23a to 23d charge photosensitive drums 22a to 22d. The photosensitive drums 22a to 22d are photosensitive members which are rotationally driven. Scanner units 20a to 20d include reflective mirrors, light-emitting elements, and so on. The scanner units 20a to 20d sequentially irradiate the photosensitive drums 22a to 22d with laser beams 21a to 21d. This forms electrostatic latent images.

The charging rollers 23a to 23d are applied with a voltage of −1,200 V, for example, as a negative high voltage. As a result, the surface potential of each of the photosensitive drums 22a to 22d is charged to −700 V, for example. The potential of the surfaces irradiated by the laser beams 21a to 21d and on which are formed the electrostatic latent images reach −100 V, for example. Developing rollers 24a to 24d of developers 25a to 25d are applied with a voltage of −350 V, for example. The developing rollers 24a to 24d supply toner to the electrostatic latent images on the photosensitive drums 22a to 22d. Toner images are formed on the photosensitive drums 22a to 22d as a result. Primary transfer rollers 26a to 26d are applied with a positive voltage of +1,000 V, for example. As a result, the toner images on the photosensitive drums 22a to 22d are transferred onto an intermediate transfer belt 30 serving as a transfer member. The intermediate transfer belt 30 is rotationally driven by rollers 31, 32, and 33, and transports the toner image to a secondary transfer roller 27 (a secondary transfer position). The transport rollers 14 and 15 resume transport of the sheet 12 so that the timing at which the toner image reaches the secondary transfer position coincides with the timing at which the sheet 12 reaches the secondary transfer position. The secondary transfer roller 27 transfers the toner image from the intermediate transfer belt 30 to the sheet 12. A fixing device 18 includes a heated pressure roller 16 and a fixing roller 17. The fixing device 18 applies heat and pressure to the toner image on the sheet 12, and fixes the toner image to the sheet 12. The sheet 12 is then discharged to the exterior of the image forming apparatus 10. A cleaning blade 35 collects toner remaining on the intermediate transfer belt 30 into a waste toner receptacle 36.

A toner cartridge is a cartridge including receptacles (the developers 25a to 25d) which hold toner used to form an image on the sheet 12. A drum cartridge is a cartridge including the photosensitive drums 22a to 22d on which the electrostatic latent images are formed. The fixing device 18 is a unit including a roller pair (the heated pressure roller 16 and the fixing roller 17) for fixing the image onto the sheet 12 onto which the image has been transferred. The intermediate transfer unit is a unit including the intermediate transfer belt 30 onto which the images formed on the photosensitive drums 22a to 22d are transferred.

The image forming apparatus 10 is an electrophotographic-type image forming apparatus that forms an image using toner. However, for example, an ink jet image forming apparatus that uses ink and forms images by ejecting the ink onto sheets may be used instead. With an ink jet image forming apparatus, an ink cartridge including a receptacle that holds the ink is a consumable of the image forming apparatus.

Printer

Figure 1B:
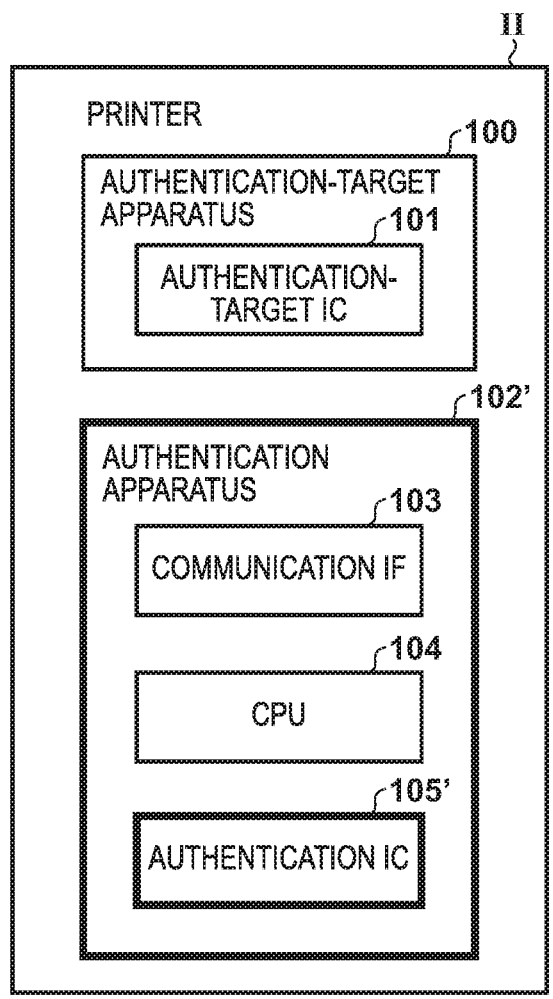

FIG. 1A illustrates the configuration of a printer I, and FIG. 1B illustrates the configuration of a printer II. The printer I and the printer II have different destinations. For example, the destination of the printer I is Japan, while the destination of the printer II is the United States. Note, however, that the elements constituting the printer I are the same as the elements constituting the printer II, and thus the same reference signs will be used. When distinguishing between the two, an apostrophe will be added at the end of the reference signs.

An authentication-target apparatus 100 is attached to a cartridge or the like. An authentication apparatus 102 determines whether or not the cartridge is genuine by authenticating the authentication-target apparatus 100. The authentication apparatus 102 is provided in the printer.

The authentication-target apparatus 100 includes an authentication-target IC 101. "IC" is an acronym of "integrated circuit". The authentication-target IC 101 may be mounted as a memory tag, for example. The authentication-target IC 101 stores information necessary for a password authentication process, a main authentication process, and so on. The "password authentication process" is an authentication process that uses a password. The "main authentication process" is an authentication process that uses an authentication key. The password authentication process may be called a "first authentication session", and the main authentication process may be called a "second authentication session".

The authentication apparatus 102 includes a communication IF 103, a CPU 104, and an authentication IC 105. The authentication IC 105 may be mounted as a memory tag, for example. The communication IF 103 is a communication circuit for communicating with the authentication-target IC 101. The CPU 104 controls authentication processes carried out between the authentication-target IC 101 and the authentication IC 105. The authentication IC 105 stores information necessary for the password authentication process, the main authentication process, and so on.

Note that authentication information stored by the authentication apparatus 102 for the printer I is different from the authentication information stored by the authentication apparatus 102' for the printer II. In other words, the authentication information stored by the authentication IC 105 is different from the authentication information stored by the authentication IC 105'. On the other hand, authentication information stored by the authentication-target apparatus 100 for the printer I is the same as authentication information stored by the authentication-target apparatus 100' for the printer II. In other words, the authentication-target IC 101 of the printer I and the authentication-target IC 101 of the printer II are the same. This means that the same cartridge and authentication-target apparatus 100 can be supplied at all destinations.

Figure 2A:
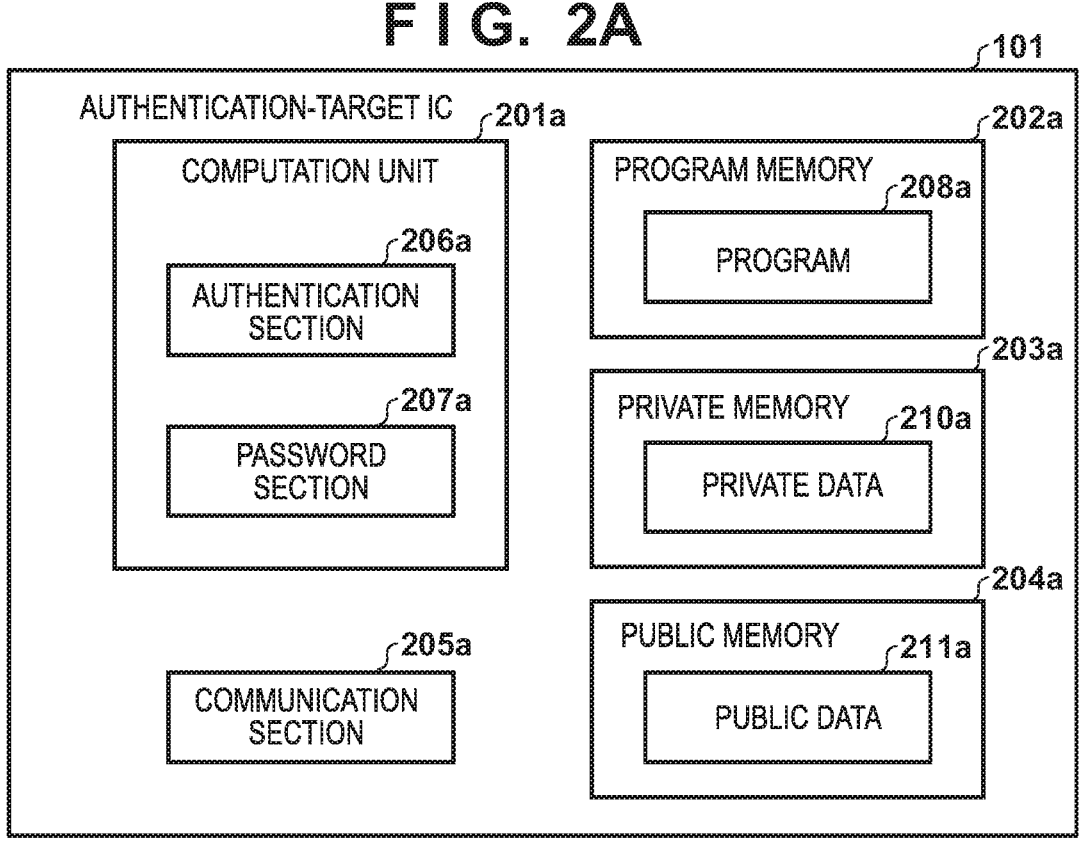
FIGS. 2A and 2B are diagrams illustrating an authentication-target IC and an authentication IC.
Figure 2B:
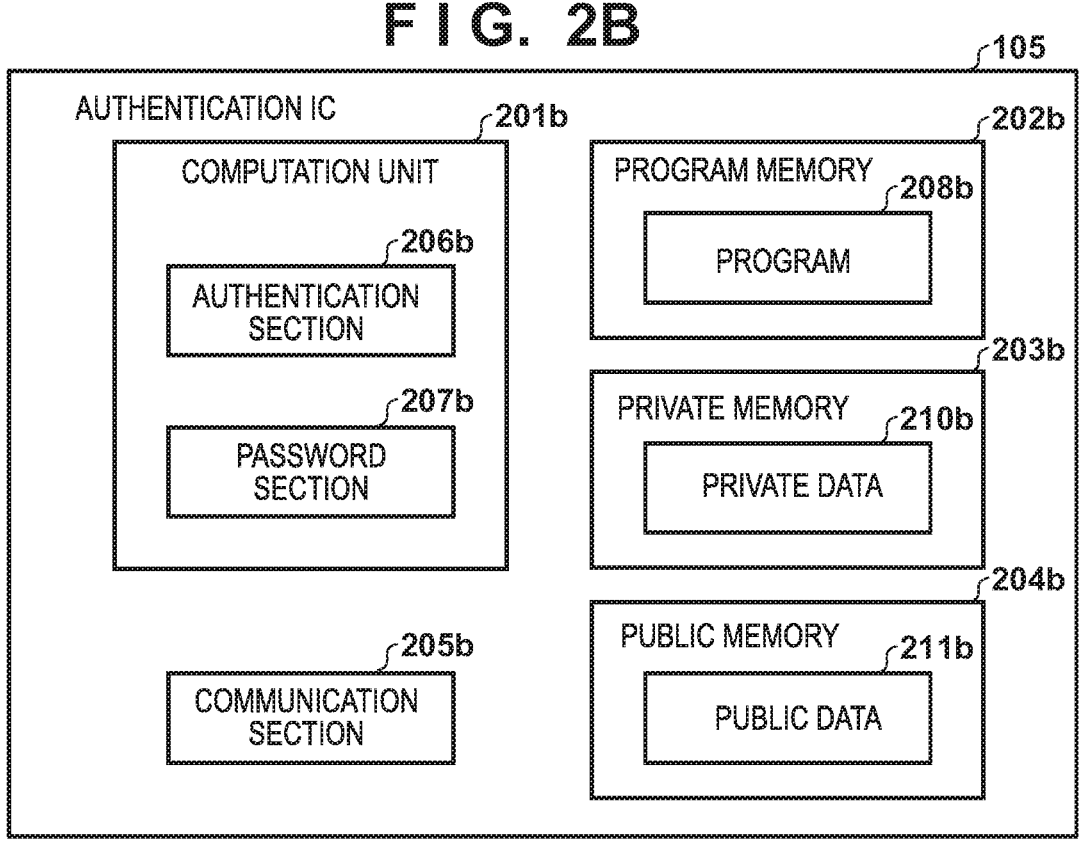

FIG. 2A illustrates the functions provided in the authentication-target IC 101. FIG. 2B illustrates the functions provided in the authentication IC 105. The functions provided in the ICs are the same or similar, and thus the respective functions have been given the same names. The letters appended to the reference signs are provided to distinguish between the functions, but will normally be omitted.

A computation unit 201a of the authentication-target IC 101 includes an authentication section 206a that handles main authentication, and a password section 207a that executes password authentication. Program memory 202a stores a program 208a executed by the computation unit 201a. Private memory 203a stores private data 210a which is not publicized outside the authentication-target IC 101. In other words, the private data 210a is secret information. Public memory 204a stores public data 211a which can be publicized outside the authentication-target IC 101. In other words, the public data 211a is public information. A communication section 205a communicates with the authentication apparatus 102 using a serial communication protocol or the like, for example.

A computation unit 201a of the authentication IC 105 includes an authentication section 206a that handles main authentication, and a password section 207a that executes password authentication. Program memory 202a stores a program 208a executed by the computation unit 201a. Private memory 203a stores private data 210a which is not publicized outside the authentication-target IC 101. Public memory 204a stores public data 211a which can be publicized outside the authentication-target IC 101. A communication section 205a communicates with the authentication apparatus 102 using a serial communication protocol or the like, for example.

A computation unit 201b of the authentication IC 105 includes an authentication section 206b that handles main authentication, and a password section 207b that executes password authentication. Program memory 202b stores a program 208b executed by the computation unit 201b. Private memory 203b stores private data 210b which is not publicized outside the authentication IC 105. In other words, the private data 210b is secret information. Public memory 204b stores public data 211b which can be publicized outside the authentication IC 105. In other words, the public data 211b is public information. A communication section 205b communicates with the CPU 104 using a serial communication protocol or the like, for example. A serial communication protocol is generally a communication method constituted by commands being sent and responses being received. Serial communication is merely an example, and another communication protocol, another connection format, and so on may be used as long as the authentication-target IC 101, the CPU 104, and the authentication IC 105 can communicate with each other.

The private memory 203 and the public memory 204 may be physically different memories, or may be the same memory. In the latter case, the private memory 203 is secured as a private storage region in physical memory. The public memory 204 is secured as a public storage region in physical memory.

Private Data and Public Data

Figure 3A:
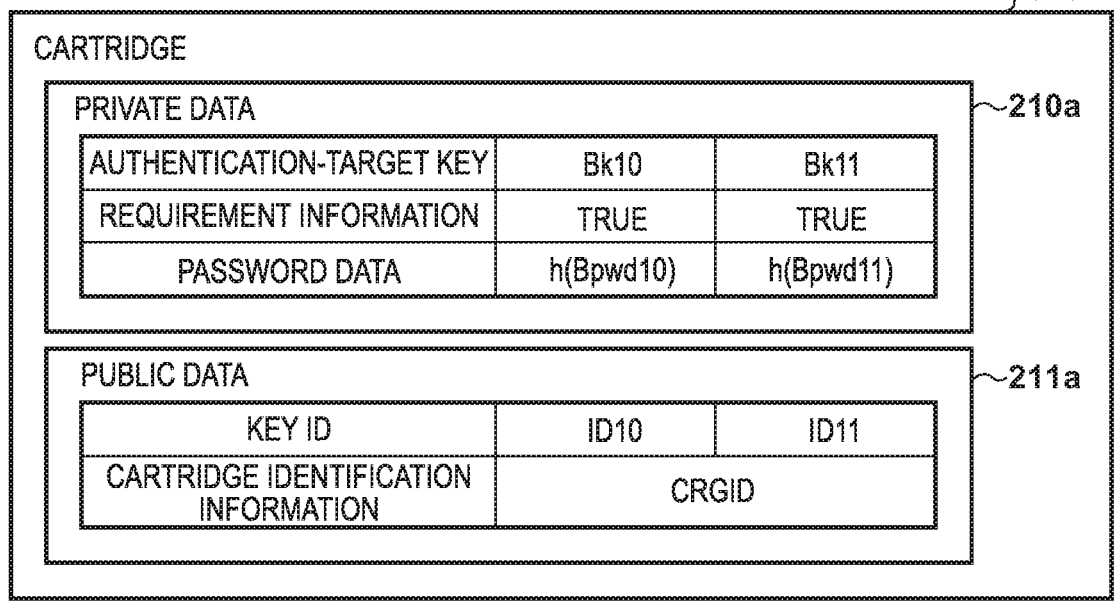
FIGS. 3A to 3C are diagrams illustrating private data and public data.

FIG. 3A illustrates the private data 210a and the public data 211a stored in the authentication-target IC provided in a cartridge 300 of the printer. The private data 210a includes a plurality of authentication-target keys, requirement information indicating whether or not password authentication is required, and password data used in password authentication. An authentication-target key Bk10 is a key used in the main authentication. A key ID10 is identification information of the authentication-target key Bk10. An authentication-target key Bk11 is a key used in the main authentication. A key ID11 is identification information of the authentication-target key Bk11. In this example, the authentication-target keys Bk10 and Bk11 both require password authentication. The password data is data computed from a derivative password (e.g., Bpwd10) derived from a password (e.g., Mpwd10), and a one-way function (e.g., h), as will be described later. The password data of the authentication-target IC 101 is compared to password data generated by the authentication IC 105. Whether or not the authentication IC 105 is genuine can be determined as a result.

The public data 211a includes a plurality of key IDs and cartridge identification information. In this example, the key ID10, which corresponds to both the authentication-target key Bk10 and password data h (Bpwd10), and the key ID11, which corresponds to both the authentication-target key Bk11 and password data h (Bpwd11), are stored. Cartridge identification information CRGID is used when the authentication IC 105 reproduces the authentication-target key Bk10 from an authentication key Mk10, generates the derivative password (e.g., Bpwd10) derived from the password (e.g., Mpwd10), and so on.

Figure 3B:
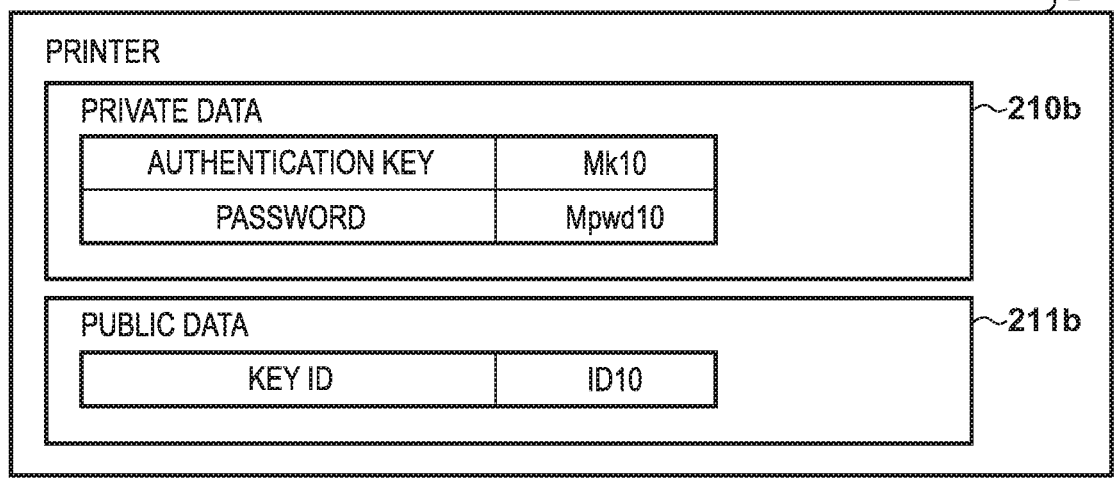

FIG. 3B illustrates the private data 210b and the public data 211b of the printer I. The private data 210b includes the authentication key Mk10 and the password Mpwd10. The public data 211b stores a key ID. The key ID10 is identification information assigned to both the authentication key Mk10 and the password Mpwd10.

Figure 3C:
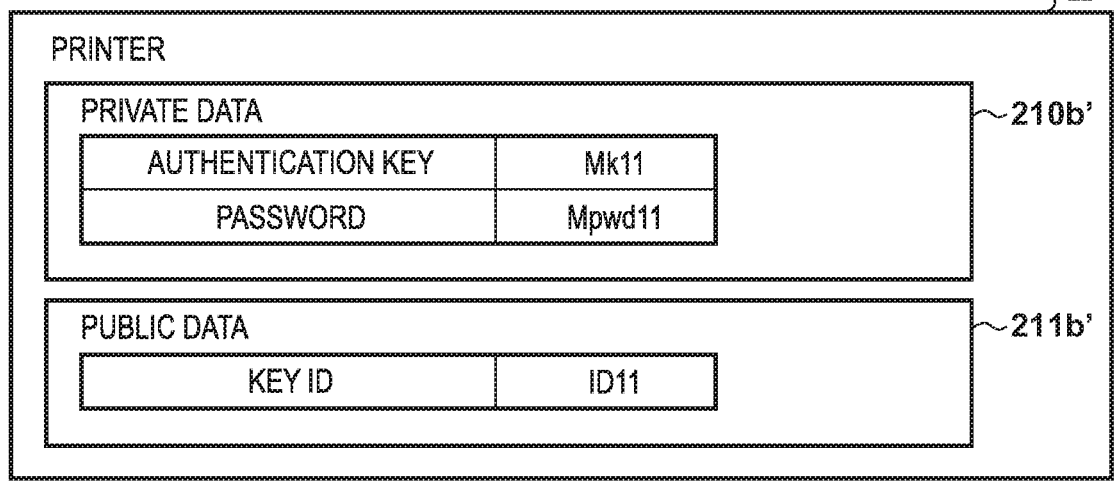

FIG. 3C illustrates the private data 210b' and the public data 211b' of the printer I. The private data 210b' includes the authentication key Mk11 and the password Mpwd11. The public data 211b' stores a key ID. The key ID11 is identification information assigned to both the authentication key Mk11 and the password Mpwd11.

Operational Expressions

An authentication-target key Bki is a derivative key derived from an authentication key Mki. i is an integer greater than or equal to 1.

$$Bki = f(Mki, \text{CRGID}) \quad (1)$$

Here, f represents a one-way function. CRGID is the cartridge identification information. The authentication-target key Bki is calculated on the basis of Expression (1) at the factory where the authentication-target IC 101 is produced, and is stored in the authentication-target IC 101. The authentication IC 105 uses Expression (1) when reproducing the authentication-target key Bki. A derivative password Bpwdi is calculated by substituting a password Mpwdi and the cartridge identification information CRGID in the following expression.

$$Bpwdi = g(Mpwdi, \text{CRGID}) \quad (2)$$

Here, g represents a one-way function.

Password data h (Bpwdi) is calculated through the following expression.

$$h(Bpwdi)=h(g(Mpwdi,CRGID)) \quad (3)$$

Here, h represents a one-way function. The authentication-target key h (Bpwdi) is calculated on the basis of Expressions (2) and (3) at the factory where the authentication-target IC 101 is produced, and is stored in the authentication-target IC 101.

In this manner, the authentication IC 105 includes a single authentication key Mki and a single password Mpwdi. The authentication-target IC 101 includes a plurality of authentication-target keys Bki and a plurality of pieces of password data h (Bpwdi). In other words, the authentication-target IC 101 can be authenticated by a plurality of authentication ICs 105. Accordingly, to copy the plurality of authentication-target keys Bki and the plurality of pieces of password data h (Bpwdi) stored in the authentication-target IC 101, it is necessary to obtain the printer I and the printer II, and expose the authentication keys Mki and the passwords Mpwdi stored in the respective printers. Furthermore, making it difficult to obtain both the printer I and the printer II is useful as a way to make it difficult to copy the plurality of authentication-target keys Bki and the plurality of pieces of password data h (Bpwdi). For example, when the printer I is sold in Europe and the printer II is sold in China, it can be difficult to obtain both the printer I and the printer II. Furthermore, selling the printer I and the printer II at different times can make it difficult to obtain both the printer I and the printer II. Thus separating the printer I and the printer II in terms of time and/or space in this manner can make the authentication system more robust.

Communication Protocol

FIGS. 4A and 4B illustrate examples of communication protocols for the communication carried out between the authentication apparatus 102 and the authentication-target apparatus 100. A command 01h is a command instructing an authentication-target process without a password to be started. The key ID used in the authentication-target process is option data of the command 01h. A command 02h is a command instructing an authentication-target process with a password to be started. The derivative password used in the authentication-target process is option data of the command 02h. A command 03 h is a command instructing an authentication-target calculation (an authentication session using an authentication-target key Bk) to be started. Calculation conditions (e.g., x, which is a one-way function, and the like) used in the authentication-target calculation are option data of the command 03h. An authentication calculation using a secret key such as HMAC, CMAC, or the like may be used as the authentication-target calculation. "HMAC" is an acronym for "Hash-based Message Authentication Code". "CMAC" is an acronym for "Cipher-based MAC". A command 04h is a command instructing an authentication check (e.g., verifying a session key x (Bk)) to be executed. The calculation conditions (e.g., the one-way function x) and the calculation results (e.g., the session key x (Bk)) used in the authentication check are option data of the command 04h. A command 40h is a command instructing a password to be generated. The password derivative (e.g., CRGID) is option data of the command 40h. A command 7Eh is a command for reading out the public data 211 from the authentication IC 105. A command 7Fh is a command for reading out the public data 211 from the authentication-target IC 101.

A response 80h is a response sent when the execution of a command has succeeded. Option data sent along with the response 80h is the execution result. A response FFh is a response sent when the execution of a command has failed.

Flows of Password Authentication and Main Authentication

Figure 5:
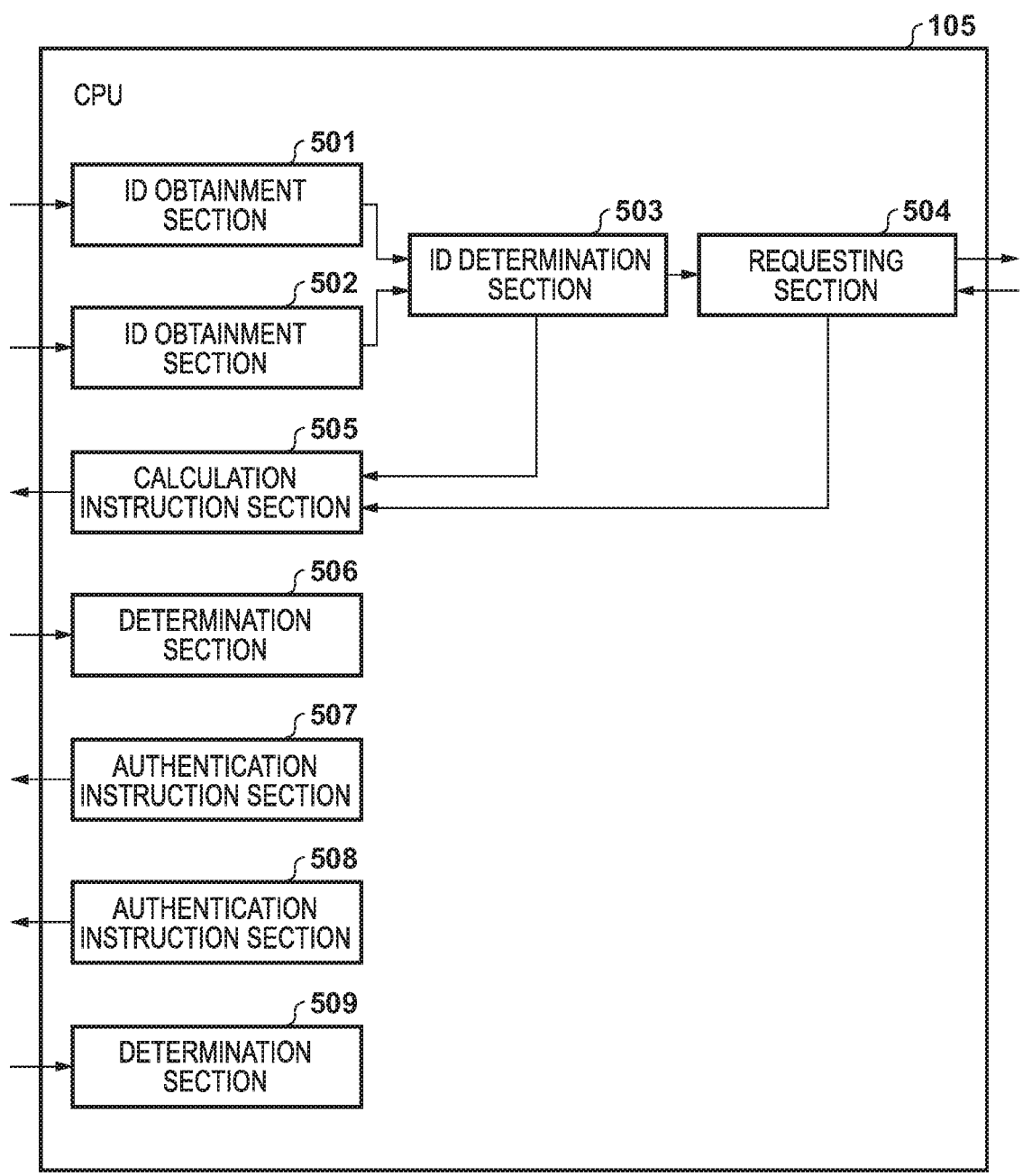
FIG. 5 is a diagram illustrating functions of a CPU.
Figure 6:
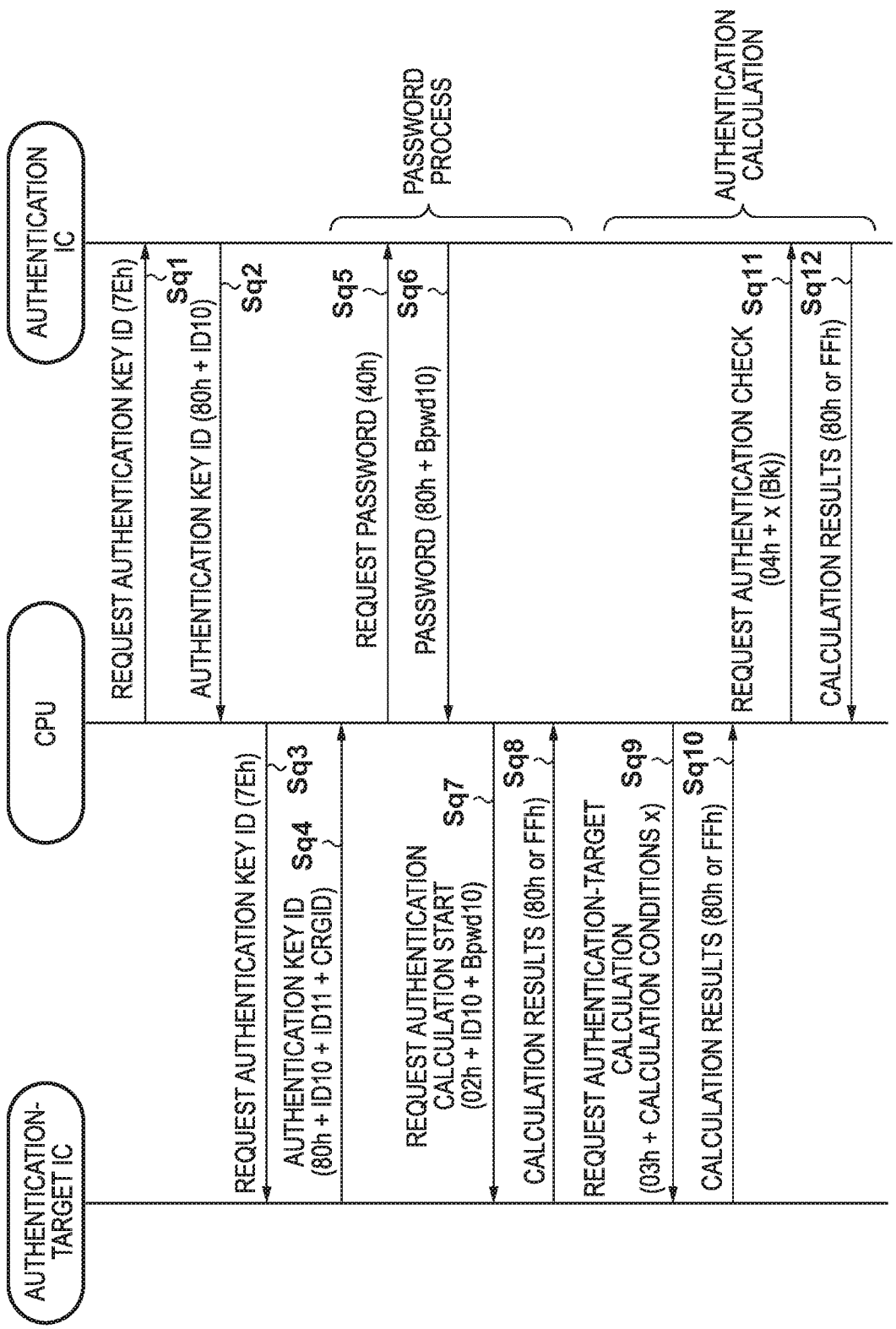
FIG. 6 is a sequence chart illustrating an authentication method.
Figure 7:
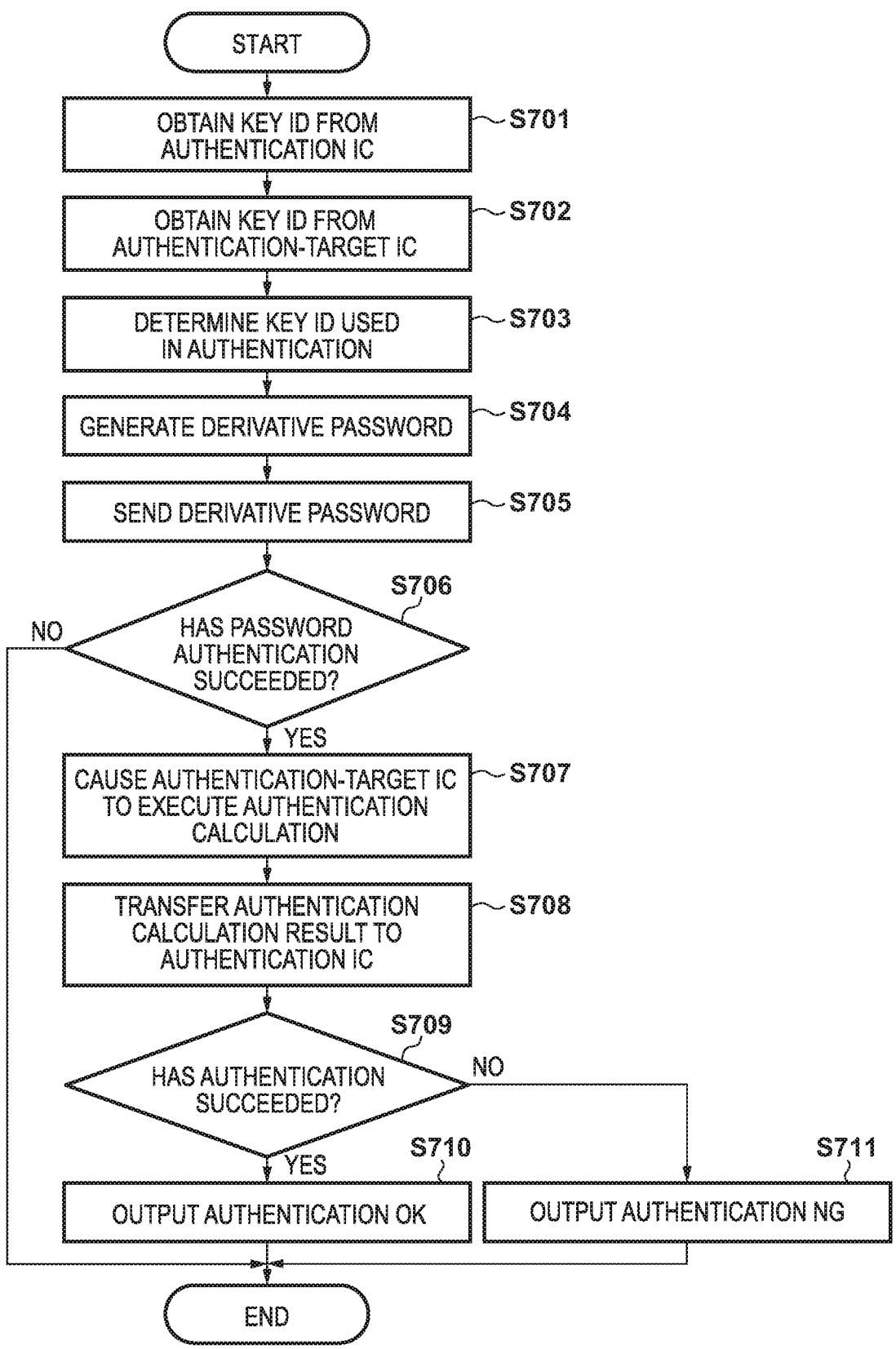
FIG. 7 is a flowchart illustrating an authentication method carried out by a CPU.
Figure 8:
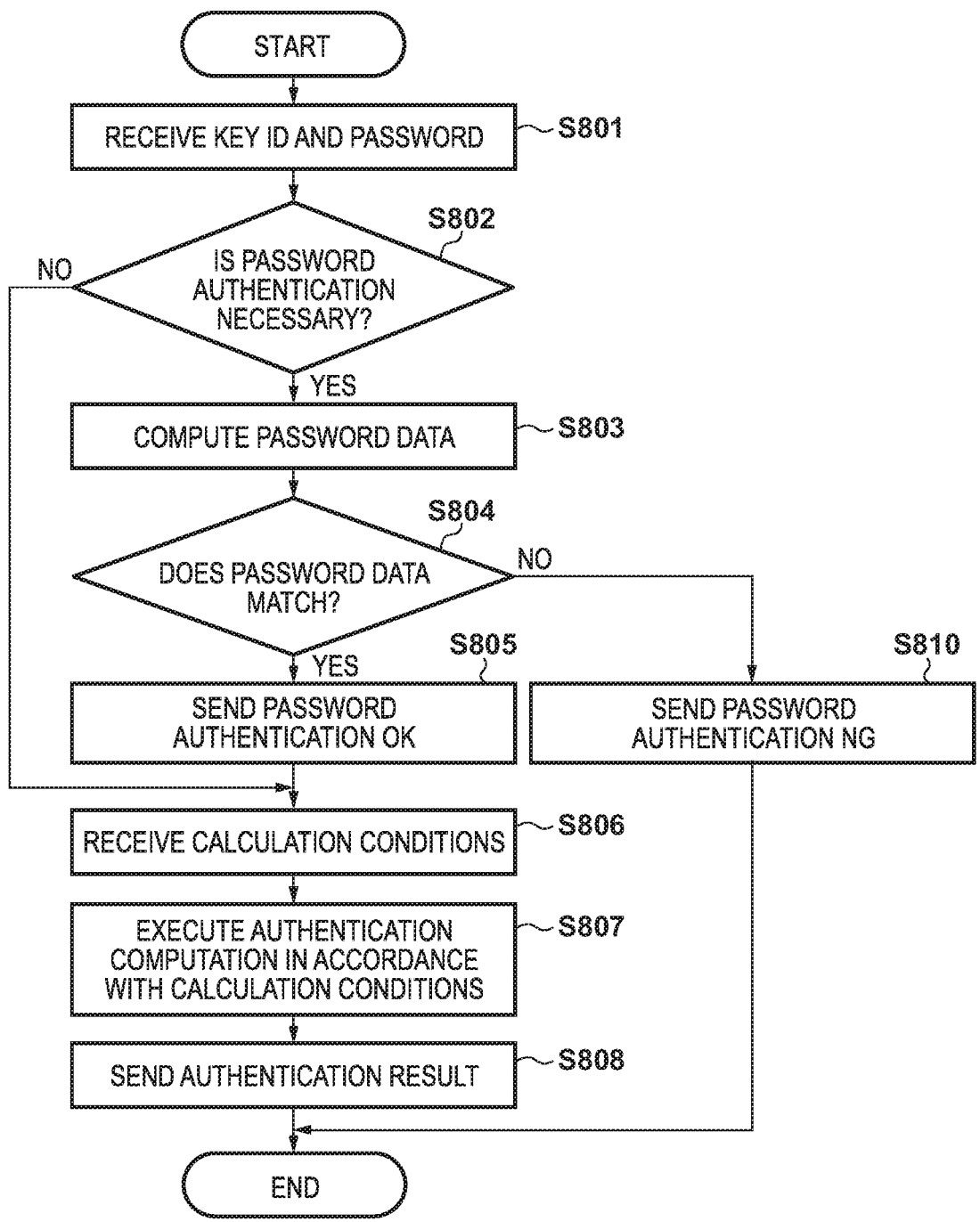
FIG. 8 is a flowchart illustrating an authentication method carried out by an authentication-target IC.

FIG. 5 illustrates functions realized by the CPU 104 executing programs. FIG. 6 illustrates a sequence of the password authentication and the main authentication. FIG. 7 illustrates the password authentication and the main authentication executed by the CPU 104. FIG. 8 illustrates a process executed by the authentication-target IC 101.

Step S701: Obtaining the Key ID from the Authentication IC

The CPU 104 (an obtainment section 501) obtains the key ID (e.g., the ID10) from the authentication IC 105. As indicated in sequence Sq1 in FIG. 6, the CPU 104 obtains the public data 211, including the key ID, from the authentication IC 105 by sending the command 7Eh to the authentication IC 105. Upon receiving the command 7Eh, the computation unit 201b of the authentication IC 105 reads out the public data 211b from the public memory 204b and creates the option data. In sequence Sq2, the computation unit 201b sends the option data along with the response 80h to the CPU 104.

Step S702: Obtaining the Key ID from the Authentication-Target IC

The CPU 104 (an obtainment section 502) obtains the key ID (e.g., the ID10, the ID11, the CRGID) from the authentication-target IC 101. As indicated in sequence Sq3 in FIG. 6, the CPU 104 obtains the public data 211, including the key ID and the cartridge identification information, from the authentication-target IC 101 by sending the command 7Eh to the authentication-target IC 101. Upon receiving the command 7Eh, the computation unit 201a of the authentication-target IC 101 reads out the public data 211a from the public memory 204a and creates the option data. In sequence Sq4, the computation unit 201a sends the option data (the key ID10 and ID and the cartridge identification information CRGID) along with the response 80h to the CPU 104.

Step S703: Determining the Key ID

The CPU 104 (an ID determination section 503) determines the key ID to be used in the authentication process on the basis of the key ID obtained from the authentication IC 105 and the key IDs obtained from the authentication-target IC 101. For example, if the key ID obtained from the authentication IC 105 is the ID10, and the key IDs obtained from the authentication-target IC 101 are the ID10 and the ID11, the ID10, which is common between the two, is selected.

Step S704: Generating the Derivative Password

The CPU 104 (a requesting section 504) requests the authentication IC 105 to generate the derivative password. As illustrated in FIG. 6, in sequence Sq5, the command 40h is sent to the authentication IC 105. The option data of the command 40h includes the cartridge identification information CRGID. The password section 207b of the authentication IC 105 reads out the password Mpwd10 from the private memory 203b. The password section 207b computes the derivative password Bpwd10 by substituting the password Mpwd10 and the cartridge identification information CRGID in Expression (2). In sequence Sq6, the password section 207b sends the response 80h and the derivative password Bpwd10 to the CPU 104. The CPU 104 receives these pieces of data. Note that the CPU 104 may obtain the password Mpwd10 from the authentication IC 105, and compute the derivative password Bpwd10 by substituting the password Mpwd10 and the cartridge identification information CRGID in Expression (2). In this case, the CPU 104 sends a command for obtaining the password Mpwd10 from the authentication IC 105, and the authentication IC 105 sends a response including the password Mpwd10.

Step S705: Sending the Derivative Password

The CPU 104 (a calculation instruction section 505) sends the derivative password Bpwd10 to the authentication-target IC 101. As indicated in sequence Sq7 of FIG. 6, the calculation instruction section 505 sends the command 02h to the authentication-target IC 101. The option data of the command 02h includes the key ID selected by the ID determination section 503 and the derivative password Bpwd10.

In step S801, the password section 207a of the authentication-target IC 101 receives the key ID and the derivative password Bpwd10. In step S802, the password section 207a reads out the requirement information corresponding to the key ID10 from the private memory 203a and determines whether or not password authentication is required. If password authentication is required (TRUE), the password section 207a moves to step S803. If password authentication is not required (FALSE), the password section 207a moves to step S806.

In step S803, the password section 207a computes the password data h (Bpwd10). The password section 207a computes the password data h (Bpwd10) by inputting the Bpwd10 received from the CPU 104 into the one-way function h. The one-way function h may be a cryptographic hash function, for example.

In step S804, the password section 207a determines whether or not the password data h (Bpwd10) found through the computation matches the password data h (Bpwd10) corresponding to the key ID10 stored in the private memory 203a. If the two match, the password section 207a moves to step S805. If the two do not match, however, the password section 207a moves to step S810. In step S810, the password section 207a sends, to the CPU 104, an indication that the password authentication has failed with the password data h (Bpwd10). For example, the password section 207a sends the response FFh.

In step S805, the password section 207a sends, to the CPU 104, an indication that the password authentication has succeeded. As indicated in sequence Sq8 of FIG. 6, the password section 207a sends the response 80h.

Step S706: Determining Success of the Password Authentication

The CPU 104 (a determination section 506) determines whether or not the password authentication has succeeded on the basis of the response received from the authentication-target IC 101. If the response 80h has been received, the CPU 104 determines that the password authentication has succeeded, and moves to step S707 to start an authentication session using the authentication-target key Bk. If the response FFh has been received, the CPU 104 determines that the password authentication has failed, and moves to step S711. In step S711, the CPU 104 outputs an indication that the authentication has failed.

Step S707: Authentication Calculation by the Authentication-Target IC

The CPU 104 (an authentication instruction section 507) requests the authentication-target IC 101 to execute the authentication-target calculation. Through this, an authentication session using the authentication-target key Bk is started. As indicated by sequence Sq9, the authentication instruction section 507 sends a response 03h to the authentication-target IC 101. The calculation conditions are included in the option data of the response 03h. In step S806, the authentication section 206a of the authentication-target IC 101 receives the calculation conditions. In step S807, the authentication section 206a executes an authentication computation in accordance with the calculation conditions. This authentication computation is executed by, for example, applying the one-way function x to the authentication-target key Bk10. In step S808, the authentication section 206a sends a result of the authentication computation to the CPU 104. The authentication section 206a inserts the authentication computation result (e.g., x(Bk10)) in the option data and sends the response 80h to the CPU 104. As indicated by sequence Sq10, the CPU 104 receives the authentication computation result (e.g., x(Bk10)) along with the response 80h.

Step S708: Authentication Calculations by the Authentication IC

The CPU 104 (an authentication instruction section 508) transfers a result of the authentication calculation to the authentication IC 105. As indicated in sequence Sq11, the CPU 104 inserts the authentication calculation result and the calculation conditions (e.g., CRGID) in the option data, and sends the command 04h to the authentication IC 105. The authentication section 206b of the authentication IC 105 reproduces the authentication-target key Bk10 in accordance with the calculation conditions and the authentication key Mk10. For example, the authentication section 206b substitutes CRGID, corresponding to the calculation conditions, and the authentication key Mk10, which has been read out from the private memory 203b, into Expression (1), and computes the authentication-target key Bk10. Furthermore, the authentication section 206b executes the authentication computation for the authentication-target key Bk10, and finds the authentication computation result (e.g., x(Bk10)). This authentication computation is executed by, for example, applying the one-way function x to the authentication-target key Bk10. The authentication section 206b determines whether or not the authentication computation result received from the authentication-target IC 101 via the CPU 104 matches an authentication computation result found by the authentication section 206b on the basis of an authentication-target key reproduced from the authentication key Mk10 and the cartridge identification information CRGID. If the two results match, the authentication section 206b sends the response 80h in sequence Sq12. If the two results do not match, the authentication section 206b sends the response FFh in sequence Sq12.

Step S709: Authentication Check

The CPU 104 (a determination section 509) determines whether or not the main authentication has succeeded on the basis of the response received from the authentication IC 105. If the response 80h has been received, it is determined that the main authentication has succeeded, and the CPU 104 moves to step S710. In step S710, the CPU 104 outputs an indication that the authentication has succeeded to a printer controller or the like. If the response FFh has been received, it is determined that the main authentication has failed, and the CPU 104 moves to step S711. In step S711, the CPU 104 outputs an indication that the authentication has failed to a printer controller or the like.

In this manner, the authentication IC 105 holding the correct password (e.g., Mpwd10) can pass the correct derivative password (e.g., Bpwd10) to the authentication-target IC 101, which makes it possible to proceed to the main authentication. In other words, an authentication IC 105 that has an erroneous password cannot proceed to the main authentication. That is, an authentication IC 105 that has an erroneous password cannot obtain the authentication computation result (e.g., x(Bk10)) from the authentication-target IC 101. Furthermore, by separating the authentication IC 105 and the authentication IC 105' with respect to space, time, or the like makes it more difficult to quickly read out the authentication-target key (e.g., Bk10, Bk11). The characteristics of the first embodiment can be understood as follows.

Characteristic 1: the authentication-target key Bki is protected by the password data. Accordingly, the authentication-target key Bki cannot be easily used.

Characteristic 2: the password Mpwdi is not sent as-is, but instead, a derivative value (Bpwdi) of the password is sent. It is therefore difficult for the password Mpwdi to be exposed. This ensures the secrecy of the password Mpwdi.

Characteristic 3: rather than the derivative value (Bpwdi) being used as-is, the password data h (Bpwdi) is calculated from the derivative value (Bpwdi) and used in the password authentication. Accordingly, neither the password Mpwdi nor the password data h (Bpwdi) are sent and received directly, and are therefore not exposed. In other words, the secrecy of the password data h (Bpwdi) is ensured.

Characteristic 4: although the authentication-target IC 101 stores a plurality of the authentication-target keys Bki and a plurality of pieces of the password data, the authentication IC 105 stores only a single authentication key Mki and a single password Mpwdi. This makes it difficult for an authentication key Mkj and a password Mpwdj to be exposed. j is an index different from i.

Characteristic 5: the key ID differs from printer destination to printer destination. In other words, the authentication key Mki and the password Mpwdi differ from printer destination to printer destination. Through this, the authentication key Mki and the authentication key Mkj can be separated from each other spatially. Likewise, the password Mpwdi and the password Mpwdj can be separated from each other spatially.

Characteristic 6: the key ID is different from printer sales period to printer sales period. In other words, the authentication key Mki and the password Mpwdi differ from printer sales period to printer sales period. For example, the authentication key Mki and the password Mpwdi of a printer sold in a first period are different from the authentication key Mkj and the password Mpwdj of a printer sold in a second period. Accordingly, the authentication key Mki and the authentication key Mkj are separated with respect to time. Likewise, the password Mpwdi and the password Mpwdj are separated with respect to time.

Characteristic 7: the authentication-target key Bki can be computed from the authentication key Mki and the cartridge identification information CRGID. Accordingly, the authentication IC can reproduce the authentication-target key Bki from secret information the authentication IC itself manages, and public information. This makes it unnecessary to send and receive the authentication-target key Bki, which suppresses situations where the authentication-target key Bki is exposed.

Characteristic 8: the derivative value Bpwdi of the password can be computed from the password Mpwdi and the cartridge identification information CRGID. Accordingly, the derivative value Bpwdi of the password can be calculated from secret information the authentication IC itself manages, and public information. Additionally, the derivative value Bpwdi of the password is sent and received, rather than the password Mpwdi. This makes it unnecessary to send and receive the password Mpwdi, which suppresses situations where the password Mpwdi is exposed.

Characteristic 9: The password Mpwdi, the authentication key Mki, the authentication-target key Bki, and the password data h (Bpwdi) are secret information. This secret information is neither sent nor received between the authentication IC 105 and the authentication-target IC 101, which ensures the secrecy of the secret information.

Characteristic 10: the key ID and the cartridge identification information CRGID are public information. The secret information is not computed from the key ID and the cartridge identification information CRGID.

Second Embodiment

Printers are continually being developed, and thus model changes are essentially made every set period (a new generation of the product is introduced). The printers I and II described in the first embodiment are provided with password checks and authentication checks, and therefore have a high level of security. However, printers i and ii (earlier models), which are the bases on which the printers I and II (later models) are developed, sometimes have authentication checks but do not have password checks. Note that the printers i and ii may be called "first-generation models", and the printers I and II may be called "second-generation models". It is furthermore assumed that the printer i and the printer I are sold at a destination I, whereas the printer ii and the printer II are sold at a destination II.

The cost of managing consumables can be reduced by having the printers i and ii use the same consumables as the printers I and II. For example, it would be troublesome for a vendor to store and manage both toner cartridges for the printers i and ii and toner cartridges for the printers I and II in a warehouse. Thus if the toner cartridges for the printers I and II can also be used by the printers i and ii, it is only necessary to store one type of common toner cartridge in the warehouse.

In this case, what is needed is for the authentication-target apparatus 100 built into the common toner cartridge to be capable of authentication by a first-generation authentication apparatus 102, as well as by a second-generation authentication apparatus 102.

Hardware

The configurations of the second-generation printers I and II and the configuration of the second-generation cartridge 300 are the same as those described in the first embodiment. On the other hand, the authentication ICs 105 in the first-generation printers i and ii do not have the password section 207b. Likewise, the authentication-target IC 101 of the first-generation cartridge 300 does not include the password section 207a.

Private Data and Public Data

First-Generation Cartridge

Figure 9A:
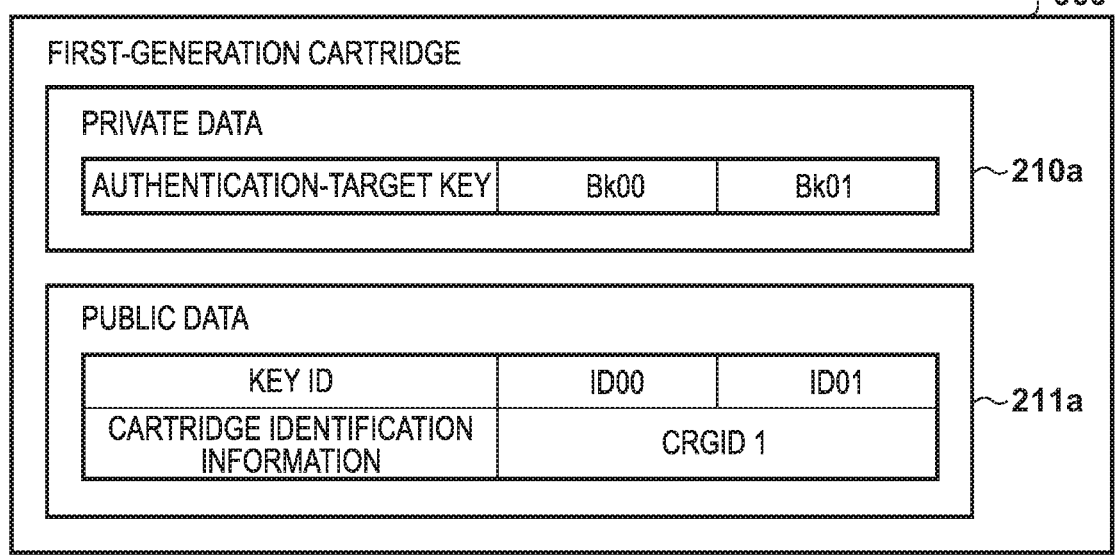
FIGS. 9A to 9C are diagrams illustrating private data and public data.

FIG. 9A illustrates the private data 210a and the public data 211a stored in the authentication-target IC 101 provided in a first-generation cartridge 900. The private data 210a includes a plurality of authentication-target keys. Authentication-target keys Bk00 and Bk01 are keys used in the main authentication. A key ID00 is identification information of the authentication-target key Bk00. A key ID01 is identification information of the authentication-target key Bk01.

The public data 211a includes a plurality of key IDs and cartridge identification information. In this example, the key ID10, which corresponds to the authentication-target key Bk00, and the key ID01, which corresponds to the authentication-target key Bk01, are stored. The cartridge identification information CRGID is used when reproducing the authentication-target key Bk00 from an authentication key Mk00 in the authentication IC 105. Likewise, the cartridge identification information CRGID is used when reproducing the authentication-target key Bk01 from an authentication key Mk01 in the authentication IC 105.

First-Generation Printers

Figure 9B:
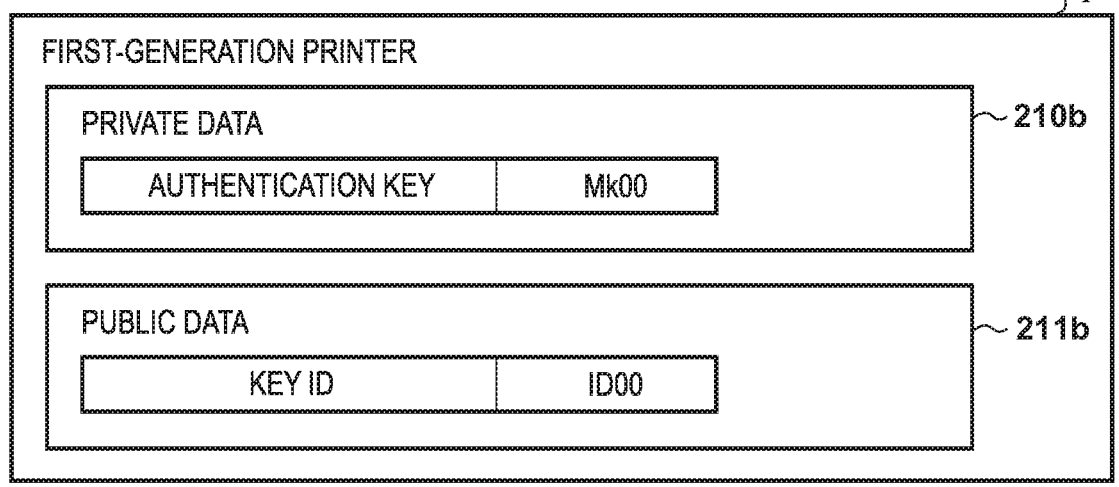

FIG. 9B illustrates the private data 210b and the public data 211b stored in the authentication IC 105 installed in the first-generation printer i sold at the destination I. The private data 210b includes the authentication key Mk00 corresponding to the key ID00. The public data 211b stores the key ID00.

Figure 9C:
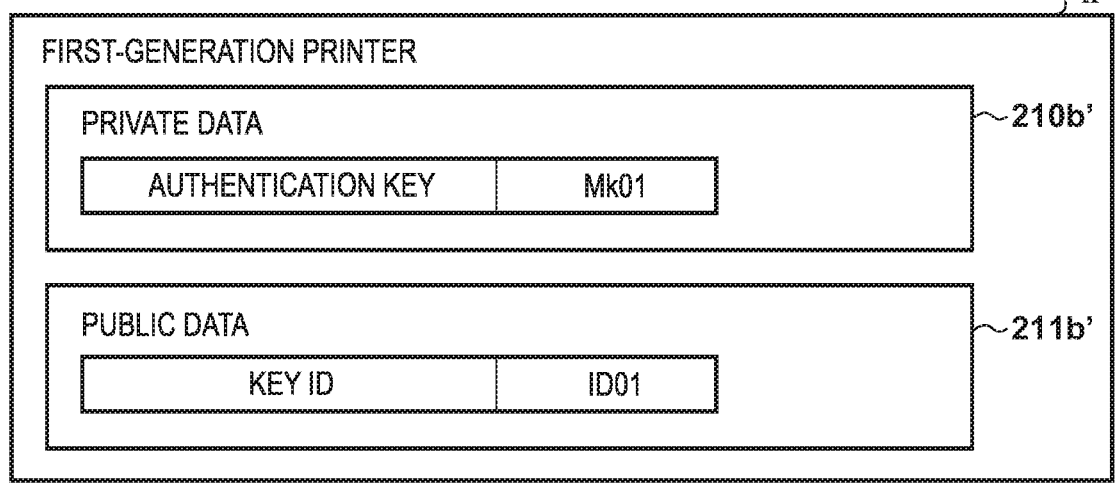

FIG. 9C illustrates the private data 210b and the public data 211b stored in the authentication IC 105 installed in the first-generation printer ii sold at the destination II. The private data 210b includes the authentication key Mk01 corresponding to the key ID01. The public data 211b stores the key ID01.

Second-Generation Cartridge (Common Cartridge)

Figure 10:
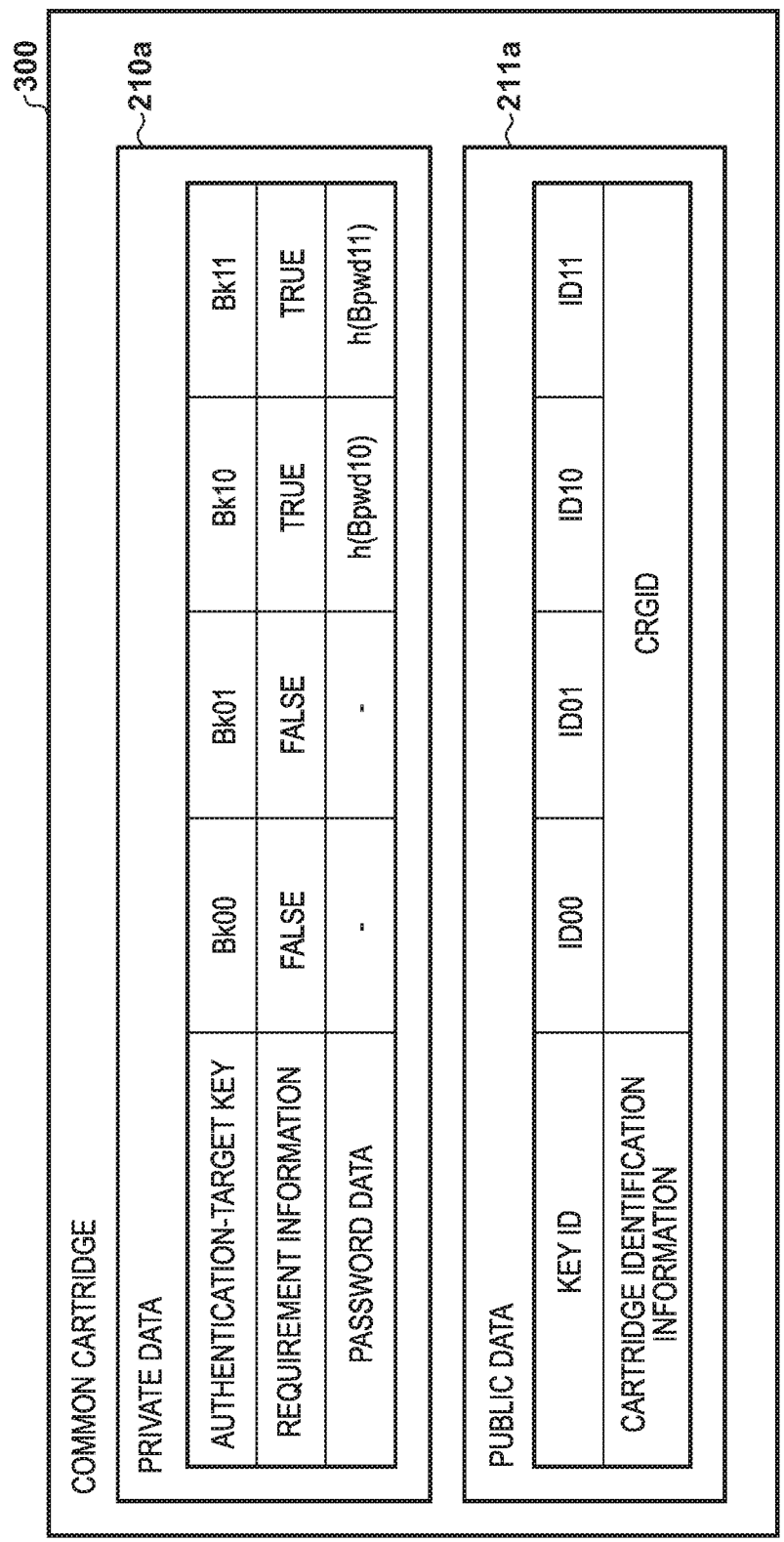
FIG. 10 is a diagram illustrating private data and public data.

FIG. 10 illustrates the private data 210a and the public data 211a stored in the authentication-target IC 101 provided in the second-generation cartridge 300. The private data 210a includes a plurality of authentication-target keys, a plurality of pieces of requirement information, and a plurality of pieces of password data.

The authentication-target key Bk00 is a key used in the main authentication for the first-generation printer i. The authentication-target key Bk01 is a key used in the main authentication for the first-generation printer ii. The authentication-target key Bk10 is a key used in the main authentication for the second-generation printer I. The authentication-target key Bk11 is a key used in the main authentication for the second-generation printer II. The authentication-target keys Bk00, Bk01, Bk10, and Bk11 correspond to the key ID00, ID01, ID10, and ID11, respectively.

The requirement information corresponding to the key ID00 is set to FALSE. The requirement information corresponding to the key ID01 is set to FALSE as well. This is because password authentication is not carried out for the first-generation printers i and ii. The requirement information corresponding to the key ID10 is set to TRUE. The requirement information corresponding to the key ID11 is set to TRUE as well. This is because password authentication is carried out for the second-generation printers I and II.

Password data corresponding to the key ID00 and ID01 is not stored. This is because password authentication is not carried out for the first-generation printers i and ii. Password data corresponding to the key ID10 and ID11 is stored. This is because password authentication is carried out for the second-generation printers I and II.

Second-Generation Printers

The private data 210b and the public data 211b for the second-generation printers I and II is the same as that illustrated in FIGS. 3B and 3C. This data will therefore not be described here.

Operational Expressions

Expression (1) is an operational expression for finding the authentication-target key Bki. In other words, the authentication-target key Bk00 is found by inputting the authentication key Mk00 and the cartridge identification information CRGID into a one-way function f. Likewise, the authentication-target key Bk01 is found by inputting the authentication key Mk01 and the cartridge identification information CRGID into the one-way function f.

Communication Protocol

The communication protocol in the second embodiment is the same as the communication protocol in the first embodiment. However, the command 40h and so on pertaining to password authentication are omitted for the first-generation printers i and ii.

Flows of Password Authentication and Main Authentication

The password authentication and main authentication carried out when the common cartridge 300 is connected to the second-generation printers I and II are the same as those described in the first embodiment. Accordingly, a flow occurring when the common cartridge 300 or the first-generation cartridge 900 is connected to the first-generation printers i and ii will be described below.

Figure 11:
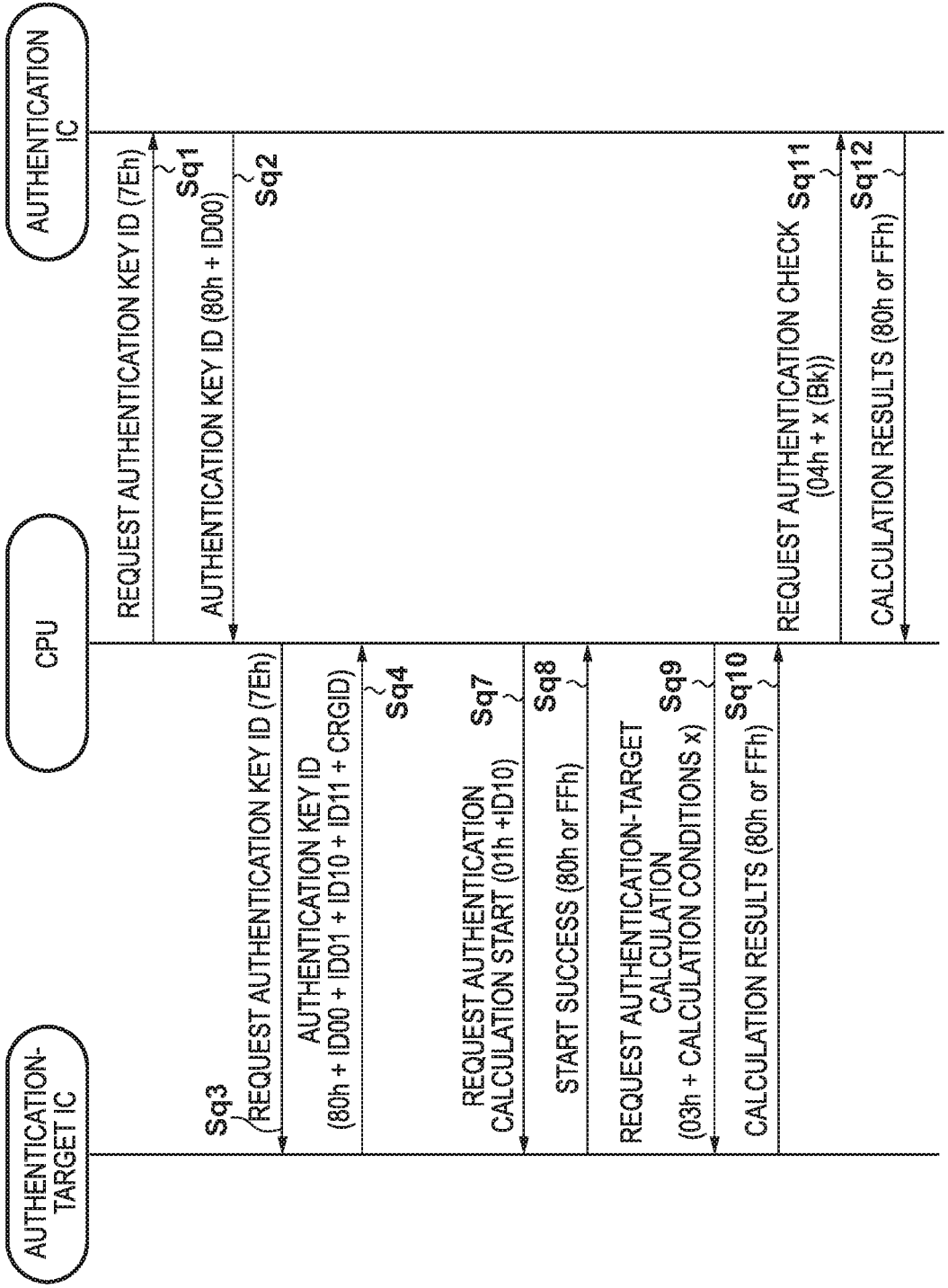
FIG. 11 is a sequence chart illustrating an authentication method.

FIG. 11 illustrates a sequence in the main authentication according to the second embodiment. FIG. 11 differs from FIG. 6 in that there is no processing pertaining to password authentication.

A Case where the First-Generation Cartridge 900 is Connected to the First-Generation Printer i In sequence Sq1, the CPU 104 (the obtainment section 501) sends the command 7Eh to the authentication IC 105. Upon receiving the command 7Eh, the computation unit 201b of the authentication IC 105 reads out the public data 211b from the public memory 204b and creates the option data.

In sequence Sq2, the computation unit 201b sends the option data along with the response 80h to the CPU 104. The authentication IC 105 of the first-generation printer i sends the key ID00.

In sequence Sq3, the CPU 104 obtains the public data 211a, including the key ID and the cartridge identification information, from the authentication-target IC 101 by sending the command 7Eh to the authentication-target IC 101. Upon receiving the command 7Eh, the computation unit 201a of the authentication-target IC 101 reads out the public data 211a from the public memory 204a and creates the option data.

In sequence Sq4, the computation unit 201a sends the option data (the key ID00 and ID01 and the cartridge identification information CRGID) along with the response 80h to the CPU 104.

The CPU 104 (the ID determination section 503) selects the common key ID00 on the basis of the key ID00 received from the authentication IC and the key ID00 and ID01 received from the authentication-target IC. Sequences Sq5 and Sq6 are not executed.

In sequence Sq7, the CPU 104 (the calculation instruction section 505) sends the command 01h and the option data (the key ID00) to the authentication-target IC 101. The authentication section 206a of the authentication-target IC 101 receives the command 01h and the option data (the key ID00). The authentication section 206a recognizes, on the basis of the command 01h or the key ID00, that the password authentication need not be carried out. The authentication section 206a reads out the requirement information in the private data 210a on the basis of the key ID00, and finds that the requirement information is FALSE. In other words, because the requirement information is FALSE, the authentication section 206a may determine that the password authentication need not be carried out.

The authentication section 206a sends the response 80h in sequence Sq8. Upon receiving the response 80h, the CPU 104 recognizes that the authentication process has been started by the authentication-target IC 101.

In sequence Sq9, the CPU 104 (the authentication instruction section 507) requests the authentication-target IC 101 to execute the authentication-target calculation. The authentication instruction section 507 sends the response 03h to the authentication-target IC 101. The calculation conditions are included in the option data of the response 03h. The authentication section 206a of the authentication-target IC 101 receives the calculation conditions. The authentication section 206a executes an authentication computation in accordance with the calculation conditions. This authentication computation is executed by, for example, applying the one-way function x to the authentication-target key Bk00.

In sequence Sq10, the authentication section 206a sends a result of the authentication computation to the CPU 104. The authentication section 206a inserts the authentication computation result (e.g., x(Bk00)) in the option data and sends the response 80h to the CPU 104. The CPU 104 receives the authentication computation result (e.g., x(Bk00)) along with the response 80h.

In sequence Sq11, the CPU 104 (the authentication instruction section 508) transfers a result of the authentication calculation to the authentication IC 105. The CPU 104 inserts the authentication calculation result and the calculation conditions (e.g., CRGID) in the option data, and sends the command 04h to the authentication IC 105. The authentication section 206b of the authentication IC 105 reproduces the authentication-target key Bk00 in accordance with the calculation conditions and the authentication key Mk00. For example, the authentication section 206b substitutes CRGID, corresponding to the calculation conditions, and the authentication key Mk00, which has been read out from the private memory 203b, into Expression (1), and computes the authentication-target key Bk00. Furthermore, the authentication section 206b executes the authentication computation for the authentication-target key Bk00, and finds the authentication computation result (e.g., x(Bk00)). This authentication computation is executed by, for example, applying the one-way function x to the authentication-target key Bk00. The authentication section 206b determines whether or not the authentication computation result received from the authentication-target IC 101 via the CPU 104 matches an authentication computation result found by the authentication section 206b on the basis of an authentication-target key reproduced from the authentication key Mk00 and the cartridge identification information CRGID.

The authentication section 206b sends the response 80h or the response FFh in sequence Sq12. The response 80h is sent when the authentication computation result received from the authentication-target IC 101 matches an authentication computation result found by the authentication section 206b on the basis of an authentication-target key reproduced from the authentication key Mk00 and the cartridge identification information CRGID. The response FFh is sent if the two do not match.

A Case where the Common Cartridge 300 is Connected to the First-Generation Printer i Sequence Sq1, sequence Sq2, and sequence Sq7 to sequence Sq12 are as described above.

In sequence Sq3, the CPU 104 sends the command 7Eh to the authentication-target IC 101. Upon receiving the command 7Eh, the computation unit 201a of the authentication-target IC 101 reads out the public data 211a from the public memory 204a and creates the option data. As illustrated in FIG. 10, the public data 211a includes the key ID00, ID01, ID10, and ID11, as well as the cartridge identification information CRGID.

In sequence Sq4, the computation unit 201a sends the option data (the key ID00, ID01, ID10, and ID11, as well as the cartridge identification information CRGID) along with the response 80h to the CPU 104.

The CPU 104 (the ID determination section 503) selects the common key ID00 on the basis of the key ID00 received from the authentication IC and the key ID00, ID01, ID10, and ID11 received from the authentication-target IC. Sequences Sq5 and Sq6 are not executed. After this, sequences Sq7 to Sq12 are executed.

A Case where the Common Cartridge 300 is Connected to the Second-Generation Printer I This is identical to the first embodiment. However, unlike the first embodiment, the authentication-target IC 101 includes the private data 210a and the public data 211a illustrated in FIG. 10. The public data 211a received from the authentication-target IC 101 includes the key ID10 or the key ID11, and the public data 211a received from the authentication IC 105 includes the key ID10 or the key ID11. As such, the CPU 104 (the ID determination section 503) may determine that password authentication can be carried out.

There are no cases where the first-generation cartridge 900 is connected to the second-generation printer I. This is because the second-generation printer I and the first-generation cartridge 900 are not compatible.

Flowchart

Figure 12:
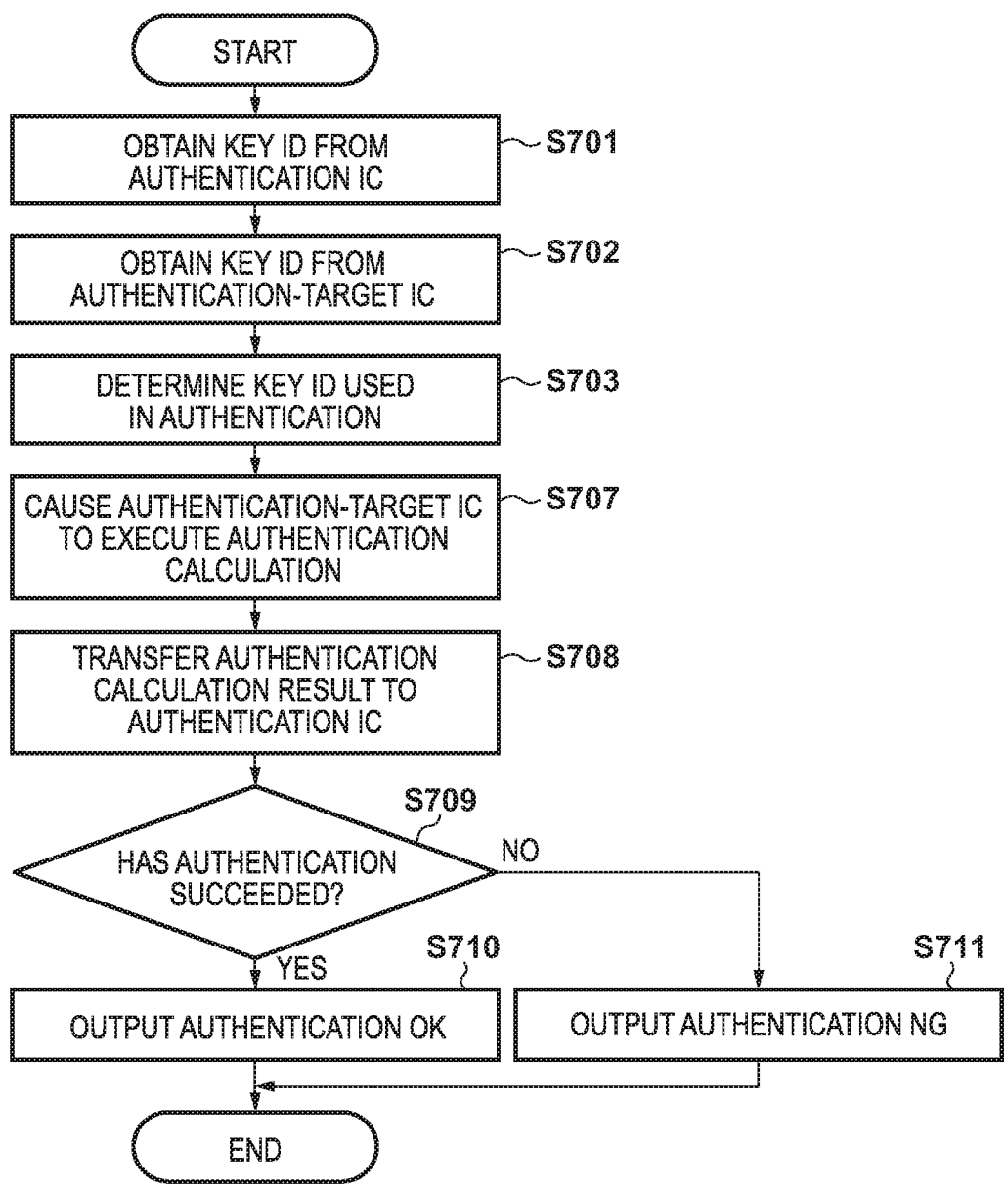
FIG. 12 is a flowchart illustrating an authentication method carried out by a CPU.

FIG. 12 is a flowchart illustrating processing executed by the CPUs 104 of the first-generation printers i and ii. Compared to FIG. 7, it can be seen that steps S704 to S706 have been omitted in FIG. 12. The other steps are the same as those described with reference to FIG. 7. The process executed by the authentication-target IC 101 in the first-generation cartridge 900 corresponds to steps S806 to S808 indicated in FIG. 8.

The process executed by the CPUs 104 of the second-generation printers I and II is the same as that illustrated in FIG. 7. The process executed by the authentication-target IC 101 in the common cartridge 300 is the same as that illustrated in FIG. 8.

Technical Spirit Derived from the First and Second Embodiments

Aspect 1

As illustrated in FIGS. 1A and 1B, the printers I and II are an example of an authentication system including the authentication-target apparatus 100 and the authentication apparatus 102 that authenticates the authentication-target apparatus 100. The authentication-target apparatus 100 includes a first storage unit (e.g., the private memory 203a, the public memory 204a) and a first computation unit (e.g., the computation unit 201a). The first storage unit stores a first authentication-target key (e.g., Bk 10) given first key identification information (e.g., ID10), and a second authentication-target key (e.g., Bk 11) given second key identification information (e.g., ID11). Furthermore, the first storage unit stores a first password (e.g., h(Bpwd10)) associated with the first key identification information, and a second password (e.g., h(Bpwd11)) associated with the second key identification information. Furthermore, the first storage unit stores identification information (e.g., CRGID) of the authentication-target apparatus 100, the first key identification information (e.g., ID10), and the second key identification information (e.g., ID11).

The authentication apparatus 102 includes a second storage unit that stores an authentication key (e.g., Mk 10), third key identification information (e.g., ID10) given to the authentication key, and a third password (e.g., Mpwd10). Furthermore, the authentication apparatus 102 includes a second computation unit (e.g., the CPU 104, the authentication IC 105).

The second computation unit determines key identification information (e.g., ID10) common between the authentication-target apparatus 100 and the authentication apparatus 102 on the basis of the first key identification information and the second key identification information, and on the basis of the third key identification information. The second computation unit computes password derivative information (e.g., Bpwd10) on the basis of identification information of the authentication-target apparatus 100 stored in the first storage unit of the authentication-target apparatus 100 and the third password stored in the second storage unit of the authentication apparatus 102. The second computation unit sends the password derivative information, and the key identification information common between the authentication-target apparatus 100 and the authentication apparatus 102, to the authentication-target apparatus 100.

The first computation unit finds a computation result (e.g., h(Bpwd10)) by applying a predetermined function (e.g., the one-way function h) to the password derivative information received from the authentication apparatus 102. The first computation unit executes password authentication on the basis of the computation result (e.g., h(Bpwd10)) and a password (e.g., h(Bpwd10)) associated with the key identification information, of the first key identification information and the second key identification information, that is common between the authentication-target apparatus 100 and the authentication apparatus 102. When the password authentication succeeds, the first computation unit finds first key derivative information (e.g., x(Bk10)) by executing a predetermined calculation (e.g., the one-way function x) on an authentication-target key (e.g., Bk10) associated with the common key identification information. The first key derivative information may be called a "first authentication value". The "common key identification information" is the identification information, of the first key identification information and the second key identification information, that is common between the authentication-target apparatus 100 and the authentication apparatus 102.

When the password authentication by the first computation unit succeeds, the second computation unit executes a predetermined computation (e.g., the one-way function f) on the basis of the identification information of the authentication-target apparatus 100 (e.g., CRGID) and the authentication key (e.g., Mk10). The authentication-target key (e.g., Bk10) associated with the key identification information common between the authentication-target apparatus 100 and the authentication apparatus 102 is reproduced as a result. The second computation unit finds second key derivative information (e.g., x(Bk10)) by executing a predetermined calculation (e.g., the one-way function x) on the reproduced authentication-target key. The second key derivative information may be called a "second authentication value". The second computation unit authenticates the authentication-target apparatus 100 on the basis of the first key derivative information found by the first computation unit and the second key derivative information found by the second computation unit. Thus according to the embodiments, the authentication-target key (e.g., Bk10) held in the authentication-target apparatus 100 is not used if the password authentication does not succeed, which improves the secrecy (the security) of the authentication-target key.

Aspect 2

The first storage unit may include a first storage region (e.g., the private memory 203a) that stores secret information and a second storage region (e.g., the public memory 204a) that stores public information. The first storage region stores the first authentication-target key, the second authentication-target key, the first password, and the second password so as not to be publicized outside the authentication-target apparatus 100. The second storage region stores the first key identification information and the second key identification information. Accordingly, a situation where the first authentication-target key, the second authentication-target key, the first password, and the second password are exposed (publicized) is suppressed.

Aspect 3

The second storage unit may include a third storage region (e.g., the private memory 203b) that stores the authentication key and the third password so as not to be publicized outside the authentication apparatus 102, and a fourth storage region (e.g., the public memory 204b) that stores the third key identification information. Accordingly, a situation where the authentication key and the third password are exposed (publicized) is suppressed.

Aspect 4

The predetermined function may be a one-way function (e.g., the one-way function h). This makes it difficult to derive the password derivative information (e.g., Bpwd10) from the computation result (e.g., h(Bpwd10)).

Aspect 5

The predetermined computation may be a computation using a one-way function (e.g., the one-way function f). Accordingly, the identification information of the authentication-target apparatus 100 (e.g., CRGID), the authentication key (e.g., Mk10), and the authentication-target key (e.g., Bk10) can be reproduced. Furthermore, it is difficult to restore the authentication key (e.g., Mk10) from the reproduced authentication-target key (e.g., Bk10).

Aspect 6

The second computation unit may include a first control section (e.g., the CPU 104) and a second control section (e.g., the computation unit 201b). The second control section and the second storage unit may be mounted on an integrated circuit (e.g., the authentication IC 105). The first control section sends an obtainment command for the third key identification information (e.g., the command 7Eh) to the second control section. The third key identification information may be obtained from the second storage unit through the second control section as a result. The first control section may be configured to determine the key identification information (e.g., ID10) common between the authentication-target apparatus 100 and the authentication apparatus 102 on the basis of the third key identification information.

Aspect 7

The first control section (e.g., the CPU 104) passes the identification information of the authentication-target apparatus 100 (e.g., CRGID) stored in the first storage unit of the authentication-target apparatus 100 to the second control section. The second control section may be configured to compute the password derivative information (e.g., Bpwd10) on the basis of the identification information of the authentication-target apparatus 100 and the third password stored in the second storage unit, and pass the computed password derivative information to the first control section.

Aspect 8

When the password authentication by the first computation unit succeeds, the first control section passes the identification information of the authentication-target apparatus 100 (e.g., CRGID) to the second control section. The second control section executes a predetermined computation (e.g., the one-way function f) on the basis of the identification information of the authentication-target apparatus 100 (e.g., CRGID) and the authentication key (e.g., Mk10). The authentication-target key (Bk10) is reproduced as a result. The second control section may be configured to find second key derivative information (e.g., x(Bk10)) by executing a predetermined calculation (e.g., the one-way function x) on the reproduced authentication-target key.

Aspect 9

As illustrated in FIG. 3A, the first storage unit may further store requirement information indicating whether or not password authentication is required. There are cases where the requirement information indicates that the password authentication will not be carried out. In this case, the first computation unit may send a response indicating failure as a response to a command pertaining to the password authentication sent from the second computation unit.

Aspect 10

As described in the second embodiment, there are cases where the requirement information indicates that the password authentication will not be carried out. In this case, the first computation unit may skip the password authentication, and then execute an authentication process of the authentication-target apparatus 100 on the basis of the first key derivative information found by the first computation unit and the second key derivative information found by the second computation unit.

Aspect 11

The authentication system may include a first authentication apparatus (the authentication apparatus 102 installed in the printer I) and a second authentication apparatus (the authentication apparatus 102 installed in the printer II) as authentication apparatuses 102.

The authentication key (e.g., Mk10) stored in the second storage unit of the first authentication apparatus, and the authentication key (e.g., Mk11) stored in the second storage unit of the second authentication apparatus, are different. The third key identification information (e.g., ID10) stored in the second storage unit of the first authentication apparatus, and the third key identification information (e.g., ID11) stored in the second storage unit of the second authentication apparatus, are different as well. Furthermore, the third password (e.g., Mpwd10) stored in the second storage unit of the first authentication apparatus, and the third password (e.g., Mpwd11) stored in the second storage unit of the second authentication apparatus, are different. As a result, multiple pieces of secret information will not be exposed at the same time.

Aspect 12

A destination country of the first authentication apparatus may be different from a destination country of the second authentication apparatus. As a result, the first authentication apparatus and the second authentication apparatus can be separated with respect to space, which makes it difficult for all of the secret information to be exposed at the same time.

Aspect 13

A shipment time of the first authentication apparatus may be different from a shipment time of the second authentication apparatus. Accordingly, the first authentication apparatus and the second authentication apparatus may be separated with respect to time. This makes it difficult for all of the secret information to be exposed at the same time.

Aspects 14 and 15

The authentication apparatus 102 may be an electronic device. The authentication-target apparatus 100 may be a consumable used by the electronic device. The electronic device may be an image forming apparatus (the printers I, II, i, and ii). The consumable may be a cartridge used by the image forming apparatus.

Aspects 16, 17, and 18

An authentication-target apparatus 100 in an authentication system, the system including the authentication-target apparatus 100 and an authentication apparatus 102 that authenticates the authentication-target apparatus 100, is provided. Additionally, an authentication apparatus 102 in an authentication system, the system including an authentication-target apparatus 100 and the authentication apparatus 102 which authenticates the authentication-target apparatus 100, is provided. As illustrated in FIG. 6 and the like, an authentication method in which the authentication apparatus 102 authenticates the authentication-target apparatus 100 is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-058898, filed Mar. 26, 2019 and 2020-038129, filed Mar. 5, 2020, which are hereby incorporated by reference herein in their entirety.

What is claimed is:

1. An authentication system comprising:
an authentication-target apparatus and an authentication apparatus that authenticates the authentication-target apparatus,
wherein the authentication-target apparatus includes:
a first storage unit that stores a first authentication-target key given first key identification information, a second authentication-target key given second key identification information, a first password associated with the first key identification information, a second password associated with the second key identification information, identification information of the authentication-target apparatus, the first key identification information, and the second key identification information; and
a first computation unit,
wherein the authentication apparatus includes:
a second storage unit that stores an authentication key, third key identification information given to the authentication key, and a third password; and
a second computation unit,
wherein the second computation unit is further configured to:
determine key identification information common between the authentication-target apparatus and the authentication apparatus on the basis of the first key identification information and the second key identification information stored in the first storage unit of the authentication-target apparatus and the third key identification information stored in the second storage unit of the authentication apparatus;
compute password derivative information on the basis of identification information of the authentication-target apparatus stored in the first storage unit of the authentication-target apparatus and the third password stored in the second storage unit of the authentication apparatus; and
send the password derivative information and the key identification information common between the authentication-target apparatus and the authentication apparatus to the authentication-target apparatus,
wherein the first computation unit is further configured to:
obtain a computation result by applying a predetermined function to the password derivative information received from the authentication apparatus;
execute password authentication on the basis of the computation result and a password associated with the key identification information, of the first key identification information and the second key identification information, that is common between the authentication-target apparatus and the authentication apparatus; and
obtain, when the password authentication succeeds, first key derivative information by executing a predetermined calculation on an authentication-target key associated with the key identification information, of the first key identification information and the second key identification information, that is common between the authentication-target apparatus and the authentication apparatus, and
wherein the second computation unit is further configured to:
reproduce, when the password authentication by the first computation unit succeeds, an authentication-target key associated with the key identification information common between the authentication-target apparatus and the authentication apparatus by executing a predetermined computation on the basis of the identification information of the authentication-target apparatus and the authentication key, and
obtain second key derivative information by executing the predetermined calculation on the reproduced authentication-target key; and
authenticate the authentication-target apparatus on the basis of the first key derivative information obtained by the first computation unit and the second key derivative information obtained by the second computation unit.

2. The authentication system according to claim 1, wherein the first storage unit includes:
a first storage region that stores the first authentication-target key, the second authentication-target key, the first password, and the second password so as not to be publicized outside the authentication-target apparatus; and
a second storage region that stores the first key identification information and the second key identification information.

3. The authentication system according to claim 1, wherein the second storage unit includes:
a third storage region that stores the authentication key and the third password so as not to be publicized outside the authentication apparatus; and
a fourth storage region that stores the third key identification information.

4. The authentication system according to claim 1, wherein the predetermined function is a one-way function.

5. The authentication system according to claim 4, wherein the predetermined computation is a computation using the one-way function.

6. The authentication system according to claim 1, wherein the second computation unit includes a first control section and a second control section;
the second control section and the second storage unit are mounted on an integrated circuit; and
the first control section is configured to obtain the third key identification information from the second storage unit through the second control section by sending an obtainment command for the third key identification information to the second control section, and determine key identification information common between the authentication-target apparatus and the authentication apparatus on the basis of the third key identification information.

7. The authentication system according to claim 6, wherein the first control section passes the identification information of the authentication-target apparatus stored in the first storage unit of the authentication-target apparatus to the second control section; and
the second control section is configured to compute the password derivative information on the basis of the identification information of the authentication-target apparatus and the third password stored in the second storage unit, and pass the computed password derivative information to the first control section.

8. The authentication system according to claim 6, wherein when the password authentication by the first computation unit succeeds, the first control section passes the identification information of the authentication-target apparatus to the second control section; and
the second control section is configured to reproduce the authentication-target key by executing the predetermined computation on the basis of the identification information of the authentication-target apparatus and the authentication key, and obtain the second key derivative information by executing the predetermined calculation on the reproduced authentication-target key.

9. The authentication system according to claim 1,
wherein the first storage unit further stores requirement information indicating whether or not password authentication is required; and
when the requirement information indicates that the password authentication will not be executed, the first computation unit sends a response indicating failure as a response to a command pertaining to the password authentication sent from the second computation unit.

10. The authentication system according to claim 9,
wherein when the requirement information indicates that the password authentication will not be executed, the first computation unit skips the password authentication, and executes an authentication process of the authentication-target apparatus based on the first key derivative information obtained by the first computation unit and the second key derivative information obtained by the second computation unit.

11. The authentication system according to claim 1,
wherein the authentication system comprises a first authentication apparatus and a second authentication apparatus as authentication apparatuses; and
the authentication key, the third key identification information, and
the third password stored in the second storage unit of the first authentication apparatus are different from the authentication key, the third key identification information, and the third password stored in the second storage unit of the second authentication apparatus.

12. The authentication system according to claim 11, wherein a destination country of the first authentication apparatus is different from a destination country of the second authentication apparatus.

13. The authentication system according to claim 11, wherein a shipment time of the first authentication apparatus is different from a shipment time of the second authentication apparatus.

14. The authentication system according to claim 1, wherein the authentication apparatus is an electronic device; and the authentication-target apparatus is a consumable used in the electronic device.

15. The authentication system according to claim 14, wherein the electronic device is an image forming apparatus; and the consumable includes at least one of a toner cartridge, a drum cartridge, an ink cartridge, a fixing unit, and an intermediate transfer belt unit used in the image forming apparatus.

16. An authentication method through which an authentication apparatus authenticates an authentication-target apparatus, wherein the authentication-target apparatus includes a first storage unit that stores a first authentication-target key given first key identification information, a second authentication-target key given second key identification information, a first password associated with the first key identification information, a second password associated with the second key identification information, identification information of the authentication-target apparatus, the first key identification information, and the second key identification information, the authentication apparatus includes a second storage unit that stores an authentication key, third key identification information given to the authentication key, and a third password, and the authentication method comprises:
the authentication apparatus:
determining key identification information common between the authentication-target apparatus and the authentication apparatus on the basis of the first key identification information and the second key identification information stored in the first storage unit of the authentication-target apparatus and the third key identification information stored in the second storage unit of the authentication apparatus;
computing password derivative information on the basis of identification information of the authentication-target apparatus stored in the first storage unit of the authentication-target apparatus and the third password stored in the second storage unit of the authentication apparatus; and
sending the password derivative information and the key identification information common between the authentication-target apparatus and the authentication apparatus to the authentication-target apparatus,
the authentication-target apparatus:
obtaining a computation result by applying a predetermined function to the password derivative information received from the authentication apparatus;
executing password authentication on the basis of the computation result and a password associated with the key identification information, of the first key identification information and the second key identification information, that is common between the authentication-target apparatus and the authentication apparatus; and
obtaining, when the password authentication succeeds, first key derivative information by executing a predetermined calculation on an authentication-target key associated with the key identification information, of the first key identification information and the second key identification information, that is common between the authentication-target apparatus and the authentication apparatus, and
the authentication apparatus:
reproducing, when the password authentication by the authentication-target apparatus succeeds, an authentication-target key associated with the key identification information common between the authentication-target apparatus and the authentication apparatus by executing a predetermined computation on the basis of the identification information of the authentication-target apparatus and the authentication key, and obtaining second key derivative information by executing the predetermined calculation on the reproduced authentication-target key, and
authenticating the authentication-target apparatus on the basis of the first key derivative information obtained by the authentication-target apparatus and the second key derivative information obtained by the authentication apparatus.

* * * * *